(12) United States Patent  (10) Patent No.: US 7,739,933 B2
Fiorani et al.  (45) Date of Patent: Jun. 22, 2010

(54) BOTTLE TRIMMER AND METHOD

(75) Inventors: David N. Fiorani, Jacobus, PA (US); John M. Mathy, Jr., Stewartstown, PA (US); Rolf E. Weingardt, York, PA (US)

(73) Assignee: Graham Engineering Corporation, York, PA (US)

( * ) Notice: Subject to any disclaimer, the term of this patent is extended or adjusted under 35 U.S.C. 154(b) by 253 days.

(21) Appl. No.: 11/847,678

(22) Filed: Aug. 30, 2007

(65) Prior Publication Data

US 2008/0042314 A1   Feb. 21, 2008

Related U.S. Application Data

(62) Division of application No. 10/957,308, filed on Oct. 1, 2004, now Pat. No. 7,441,486.

(51) Int. Cl.
*B26D 7/00* (2006.01)
*B29C 49/74* (2006.01)

(52) U.S. Cl. .............................. 83/13; 83/410.9; 83/566; 425/527; 264/161

(58) Field of Classification Search ...................... 83/13, 83/946, 566, 924, 418, 411.1, 410.9, 881, 83/879, 882, 411.5, 883, 171, 495; 425/537, 425/527; 30/495; 82/101, 47, 18, 2.5, 2.7, 82/102; 156/584, 446, 924, 946
See application file for complete search history.

(56) References Cited

U.S. PATENT DOCUMENTS 3,060,497 A   10/1962   Boyer
3,172,152 A   3/1965    Uhlig
3,213,725 A   10/1965   Settembrinni
3,279,599 A   10/1966   Drennan ..................... 209/531
3,319,498 A   5/1967    Wolford
3,391,588 A   7/1968    Brown ........................... 83/24
3,406,598 A   10/1968   Doucet
3,429,211 A   2/1969    Pelot ............................. 82/46
3,448,648 A   6/1969    Magruder et al. ............. 83/566
3,457,590 A   7/1969    Dittman .......................... 18/5
3,481,234 A * 12/1969   Luce, Sr. ........................ 82/85
3,540,371 A   11/1970   Rudolph et al. ............... 101/38
3,675,521 A   7/1972    Ziegler ......................... 82/101
3,756,103 A * 9/1973    Cvacho et al. ................ 82/101
3,797,985 A   3/1974    Garver ........................ 425/305
3,800,638 A   4/1974    Duikers et al. ................ 82/101
3,804,573 A   4/1974    Del Piero .................... 425/387
3,818,785 A   6/1974    Wakabayashi ............... 82/101
3,862,698 A   1/1975    Hafele ........................... 215/1
3,906,821 A   9/1975    Schultz ......................... 82/79

(Continued)

FOREIGN PATENT DOCUMENTS

CH   393720 A   6/1965
JP   61148024 A   7/1986
JP   07148827 A   6/1995
JP   11342531 A   12/1999

*Primary Examiner*—Ghassem Alie
(74) *Attorney, Agent, or Firm*—Hooker & Habib, P.C.

(57) ABSTRACT

A method of cutting or trimming a plastic body ejected from a blow mold that is especially suitable for high-output production lines. A log conveyor is continuously moved along a path. The body to be trimmed is placed between holders carried by the conveyor and trimmed by rotating the holders as the conveyor moves past a trim knife extending along the path.

28 Claims, 21 Drawing Sheets

U.S. PATENT DOCUMENTS

| | | | |
|---|---|---|---|
| 3,962,938 A | 6/1976 | Reilly et al. | 82/47 |
| 3,967,516 A | 7/1976 | Griesing et al. | 82/47 |
| 4,141,267 A * | 2/1979 | Pryor et al. | 83/712 |
| 4,305,904 A | 12/1981 | Black | 264/536 |
| 4,445,406 A | 5/1984 | Thatcher | 82/46 |
| 4,557,167 A | 12/1985 | Cvacho | 82/47 |
| 4,614,018 A | 9/1986 | Krall | 29/33 |
| 4,732,027 A | 3/1988 | Traczyk et al. | 72/133 |
| 4,782,728 A * | 11/1988 | Thatcher | 82/47 |
| 4,843,930 A | 7/1989 | Ashbolt | 83/39 |
| 4,876,930 A | 10/1989 | Thatcher | 82/46 |
| 4,961,701 A | 10/1990 | Barth | 425/527 |
| 4,982,635 A | 1/1991 | Thatcher | 83/149 |
| 5,163,347 A | 11/1992 | Le Naour et al. | 82/84 |
| 5,167,968 A | 12/1992 | Dunlap et al. | 425/302.1 |
| 5,201,351 A * | 4/1993 | Hurdle, Jr. | 144/39 |
| 5,257,560 A | 11/1993 | Palazzolo | 82/46 |
| 5,603,249 A | 2/1997 | Weber et al. | 82/52 |
| 5,787,772 A | 8/1998 | Weber et al. | 82/47 |
| 6,360,414 B1 * | 3/2002 | Maddox et al. | 29/33 A |
| 6,530,301 B1 | 3/2003 | Seitz et al. | 83/23 |
| 6,619,946 B1 | 9/2003 | Marshall et al. | 425/305.1 |
| 6,669,461 B1 | 12/2003 | Taylor et al. | 425/537 |
| 6,675,680 B1 | 1/2004 | Seitz et al. | 83/23 |
| 6,896,507 B2 | 5/2005 | Crider et al. | |
| 6,928,913 B2 | 8/2005 | Darr | 83/410.9 |
| 6,952,988 B2 | 10/2005 | Darr | 83/410.9 |
| 7,124,673 B2 | 10/2006 | Vidal Caupena et al. | 83/410.9 |
| 2004/0011169 A1 | 1/2004 | Marshall et al. | 83/13 |
| 2004/0050220 A1 * | 3/2004 | Proffitt et al. | 82/47 |
| 2004/0185134 A1 | 9/2004 | Fiorani et al. | 425/537 |
| 2005/0098922 A1 | 5/2005 | Humphreys et al. | 264/320 |

* cited by examiner

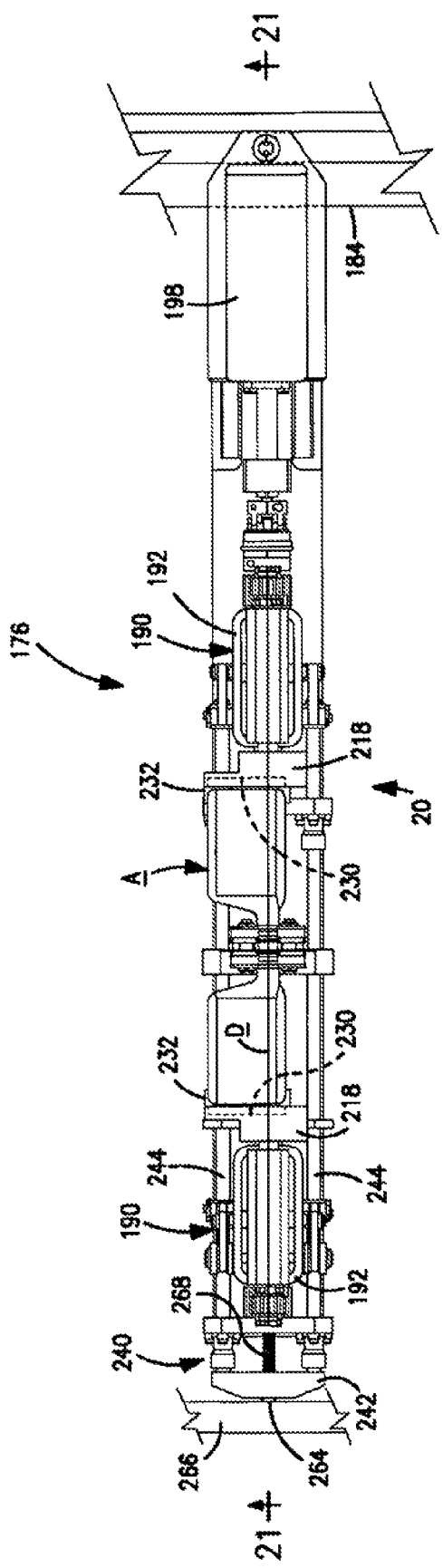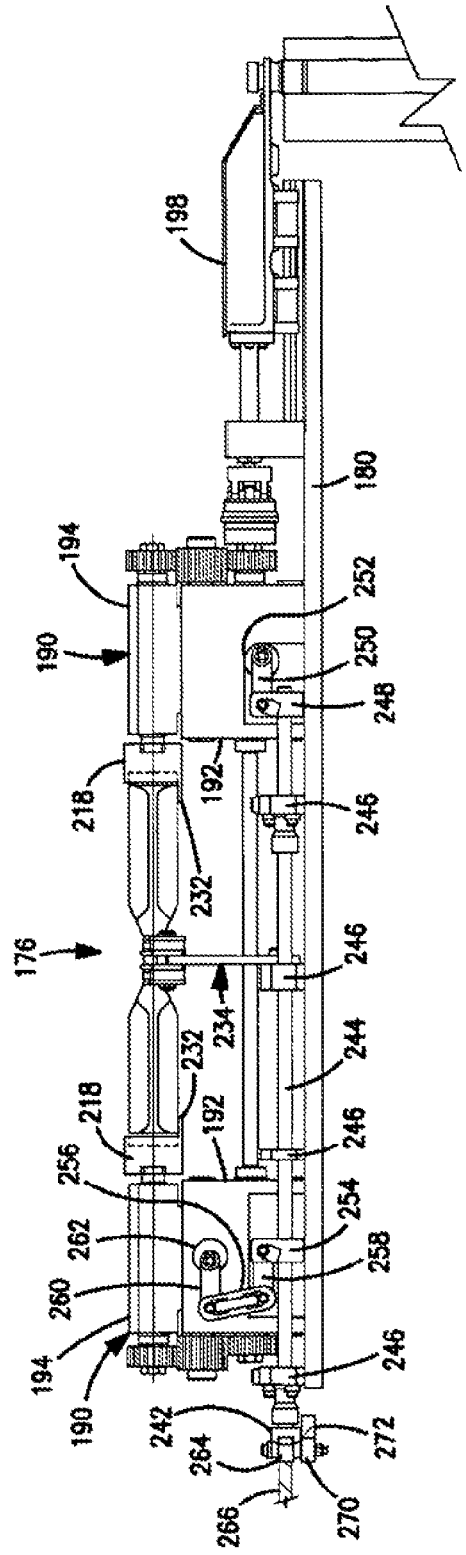

BOTTLE TRIMMER AND METHOD

This application is a division of our co-pending U.S. patent application Ser. No. 10/957,308 filed Oct. 1, 2005.

FIELD OF THE INVENTION

The invention relates to machines and methods for trimming plastic from blow molded plastic bottles.

DESCRIPTION OF THE PRIOR ART

Pairs of plastic bottles are often manufactured simultaneously by blow-molding a two-bottle log. The neck ring joining the two bottles must be trimmed away to separate the bottles.

A known trimmer disclosed in Thatcher, U.S. Pat. No. 4,782,728 trims a plastic object into two parts. The Thatcher trimmer receives the plastic object at a trimming station. The plastic object remains at the trimming station during the entire trimming process. The trimmer grasps the object and rotates the object. A knife located at one side of the trimmer pierces the object and the object is then rotated so that the knife cuts around the entire outer periphery of the object.

Although the Thatcher trimmer could perhaps be modified to include a pair of knives to cut the neck ring from a two-bottle log, such a trimmer would operate at relatively low production rates because each log must be brought to a stop along the production line before trimming.

Other trimming devices trim plastic logs as the logs move continuously along a path. A belt or pulley engages one side of the logs to cause the logs to rotate about the neck axis. A knife extends along the path, and the rotating logs engage the knife to trim the log. Although these trimming devices can trim moving logs, the devices rely upon the logs having a circular cross section adjacent the belt or pulley to impart rotation of the log. The log neck axis must be coaxial with the log cross section. Logs having axially offset necks or with non-circular bottle cross sections cannot be trimmed.

Thus there is a need for a trimmer capable of high production rates that can trim logs having axially offset necks or with non-circular bottle cross sections.

SUMMARY OF THE INVENTION

The invention is an improved method of trimming the necks of plastic multi-bottle logs that provides high production rates and can trim logs having offset necks or non-circular bottle portions, and a trimmer implementing the method.

A method of trim cutting a plastic log in accordance with the present invention includes continuously moving a log holder along a path between an intake location and a discharge location. The log holder has first and second holders configured to receive respective end portions of the log.

The body is placed on the log holder between the first and second holders at the intake location along the path. The body is received on an axis with respect to the first and second holders, the continuous movement of the log holder moving the holders and the body away from the intake location in a downstream direction along the path. Each holder moves axially towards the body and receives a respective end portion of the body to hold the body on the log holder. The body is maintained in a stationary position with respect to the axis as the holders move to hold the body. The holders are then rotated about an axis, thereby rotating the body in the holders about the axis.

The log holder carrying the rotating body moves past a stationary trim knife extending a distance along the path. The trim knife engages the rotating body between the holders and thereby cuts and trims the body as the log holder moves along the path.

After cutting, each holder moves axially away from the cut body to release the plastic body. The cut plastic body is discharged from the log holder at the discharge location.

A trimmer in accordance with the method of the present invention moves the logs continuously along a path while cutting, thereby enabling high production rates. The holders can be configured to receive bottle end portions that are non-circular, allowing even bottles having a substantially rectangular cross section to be cut and trimmed at high speed. The holders can also be configured to rotate about an offset neck axis for trimming bottles having offset necks.

The trimmer of the present invention preferably forms part of a high-speed production line that receives multi-bottle plastic logs from a blow molding machine and continuously moves the logs along the production line for removing flash and trimming neck rings.

Other objects and features of the invention will become apparent as the description proceeds, especially when taken in conjunction with the accompanying drawings illustrating the invention, of which there are 21 sheets and one embodiment.

DESCRIPTION OF THE DRAWINGS

FIG. 4 is a top view after trimming of the neck ring to form two trimmed bottles;

FIG. 19 is a top view of a spin trim assembly;

FIG. 20 is a view taken in the direction of arrow 20 in FIG. 19;

DESCRIPTION OF THE PREFERRED EMBODIMENT

High-speed bottle trimmer 10 accurately and reliably removes neck flash and bottle rings from blow molded two-bottle logs where the neck axes are offset to one side of the center of the log.

Figure 2:
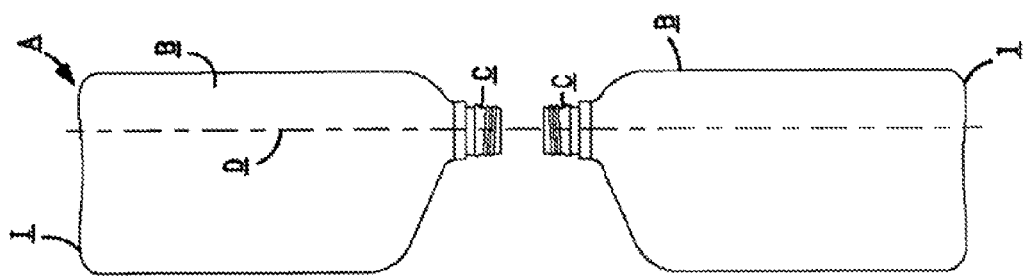
FIGS. 1 and 2 are side and top views of a blow molded two-bottle log trimmed by the bottle trimmer.
Figure 1:
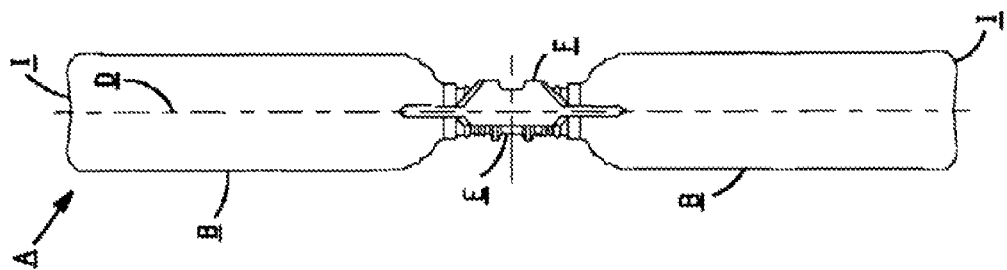

FIGS. 1 and 2 show a two-bottle log A as ejected from a blow molding machine with tail flash removed. The log A includes two blow molded bottled B having necks C located on an axis D offset to one side of the sides of the bottles. Neck ring E extends between the two necks C. Neck flash F extends in the recess between the bottles to one side of the necks and ring. Neck flash G extends between the bottles in the recess to the opposite side of the necks and ring.

Figure 3:
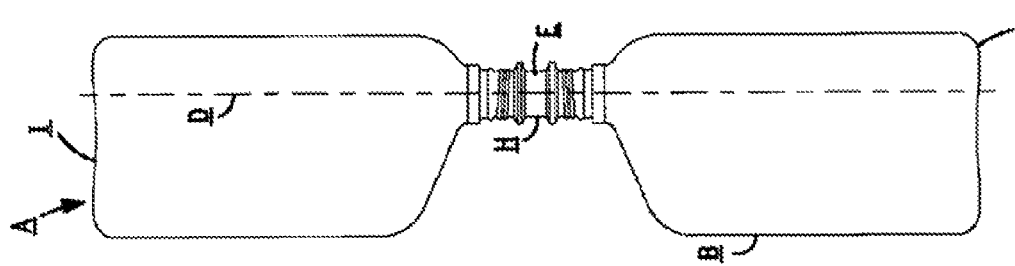
FIG. 3 is a top view of the log after removing neck flash.
Figure 2:
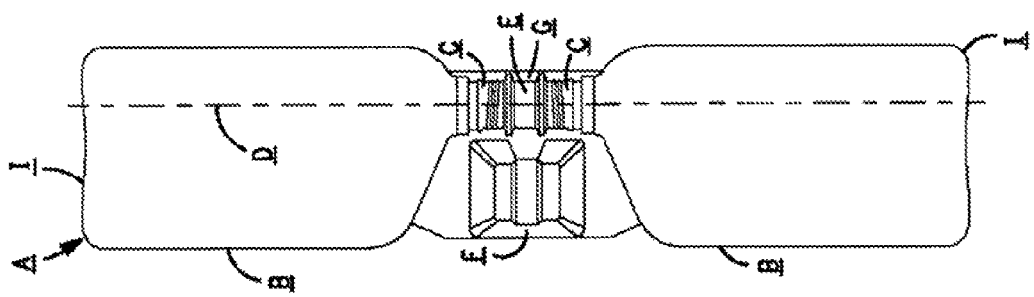

FIG. 3 illustrates log A with neck flash F and G trimmed away. FIG. 4 illustrates the log with neck ring E trimmed away to separate bottles B and complete the trimming operation.

Figure 5:
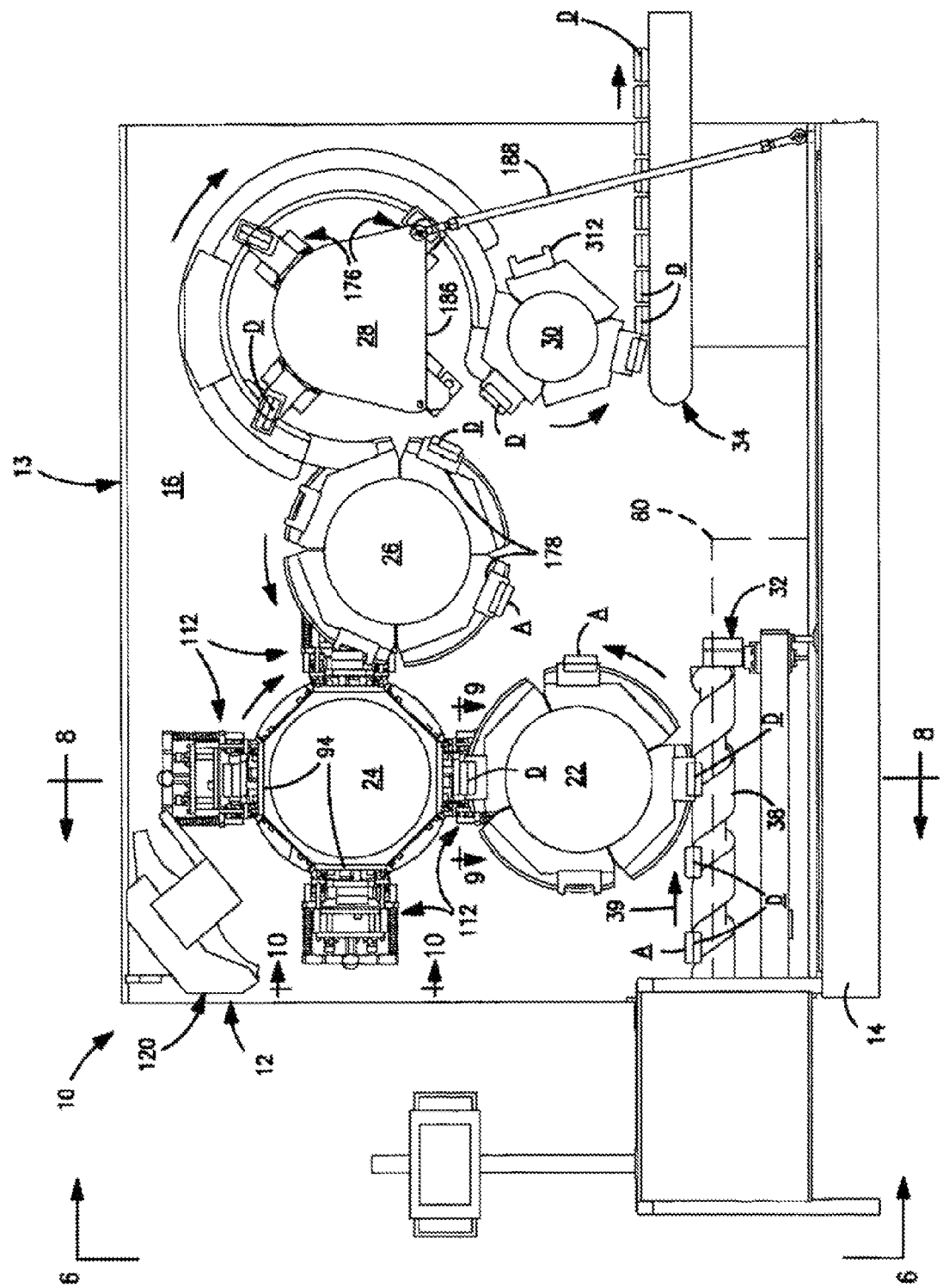
FIG. 5 is a front view of a high-speed bottle trimmer.
Figure 6:
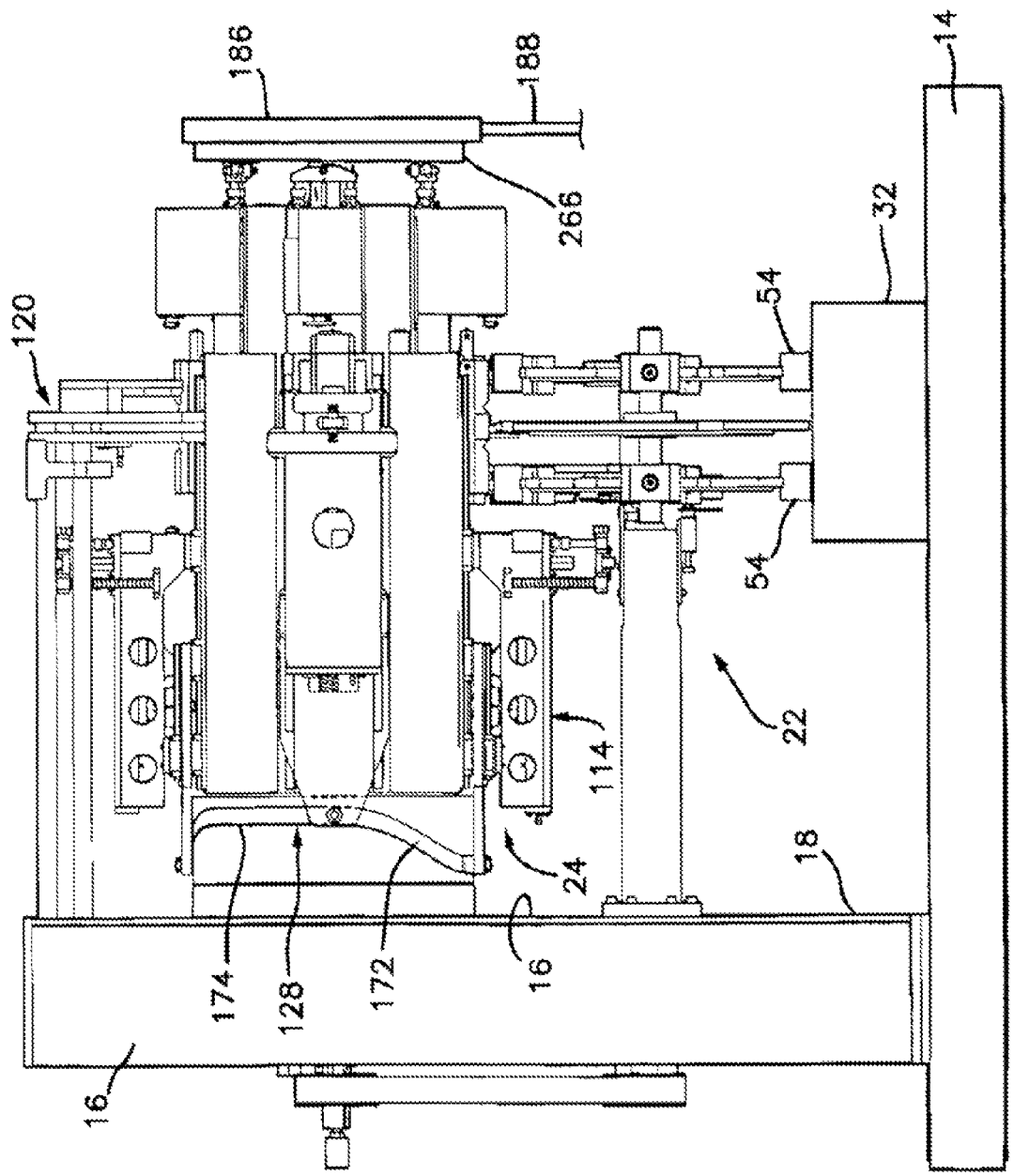
FIG. 6 is a side view along line 6-6 of FIG. 5.

High-speed bottle trimmer 10 includes a frame 12 having a base 14 mounted on a workspace floor and a vertical mounting wall 16 extending above one side of the base and running along the length of the base, as illustrated in FIGS. 5 and 6. The wall includes a front mounting plate 18 and end and top plates defining a rectangular recess 20 behind plate 18.

Infeed star wheel 22, neck flash trim wheel 24, intermediate star wheel 26, spin trim wheel 28 and discharge star wheel 30 are cantilever-mounted on wall 16 and extend outwardly from the wall overlying base 14. See FIG. 6. Infeed screw conveyor 32 is mounted on base 14 under infeed star wheel 22. Discharge conveyor 34 is mounted on base 14 under star wheel 30. The conveyors and wheels are driven by electric drive system 36 located principally in recess 20.

Infeed conveyor 32 includes a pair of feed screws 38 (only one illustrated) which are rotated to feed spaced flat logs A as shown in FIGS. 1 and 2 in the direction of arrow 39 for vacuum pick up by infeed star wheel 22. As illustrated in FIG. 1, the offset neck axis D is adjacent the downstream side of the logs.

Figure 8:
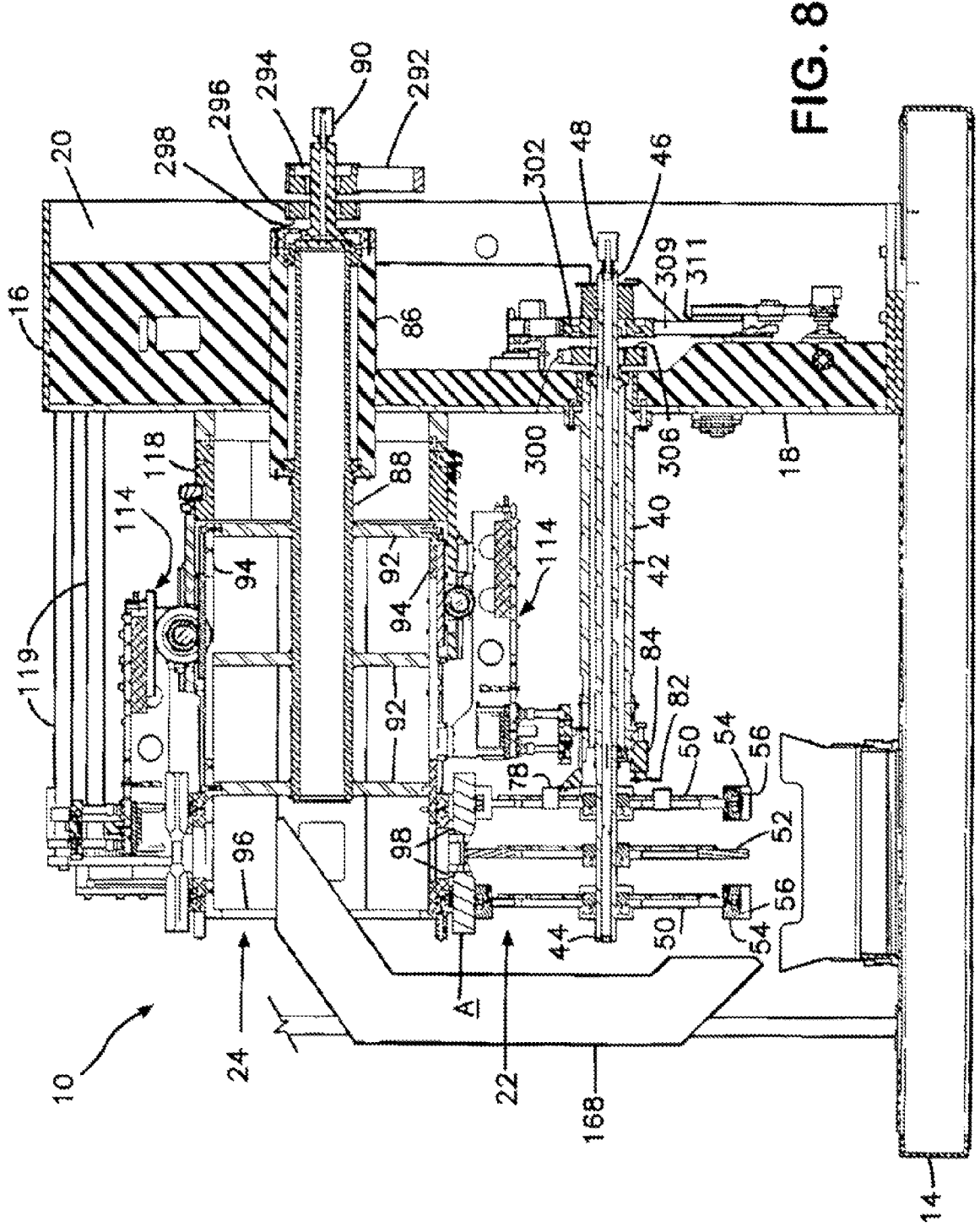
FIG. 8 is a sectional view taken along line 8-8 of FIG. 5.

Infeed star wheel 22 is illustrated in FIG. 8 and includes a hub 40 mounted on wall 16 and extending outwardly from the wall over base 14. Drive shaft 42 is journaled in bearings in the ends of the hub and includes an outer end 44 extending beyond the hub and an inner end 46 extending into recess 20. Shaft 42 is hollow with the inner end of the shaft supporting a rotary fitting 48 connected to a source of compressed air. The shaft outer end 44 is closed. The shaft supports two spaced radial nest plates 50 and a radial neck support plate 52 located between the nest plates. Each nest plate 50 supports four ninety degree-oriented vacuum nests 54 which engage the bottles of logs A transferred by wheel 22 from conveyor 32 to wheel 24. The nests 54 on plates 50 are axially aligned so that a nest in each wheel engages one bottle of a log to rotate the log to wheel 24.

Figure 9:
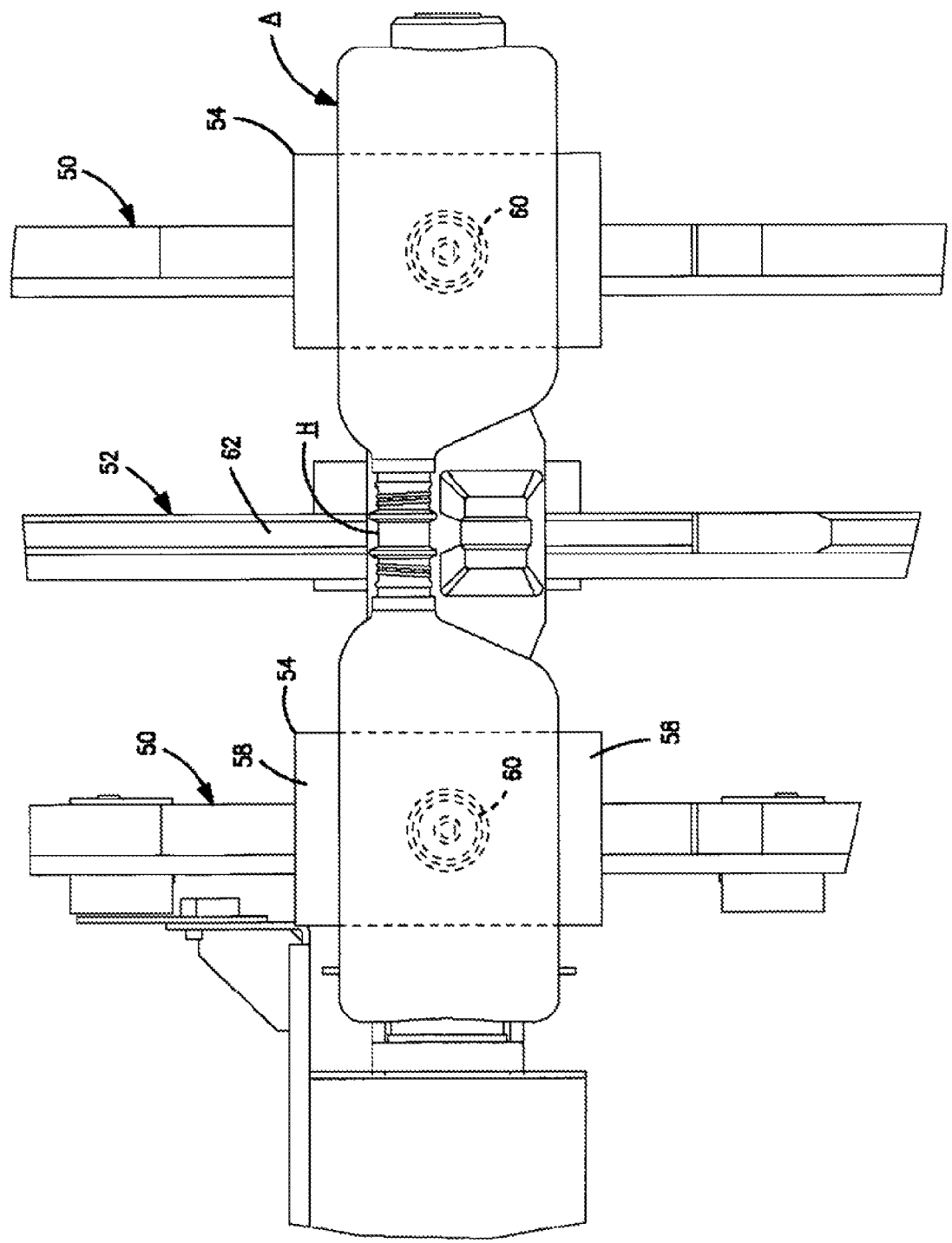
FIG. 9 is a view taken along line 9-9 of FIG. 5.
Figure 10:
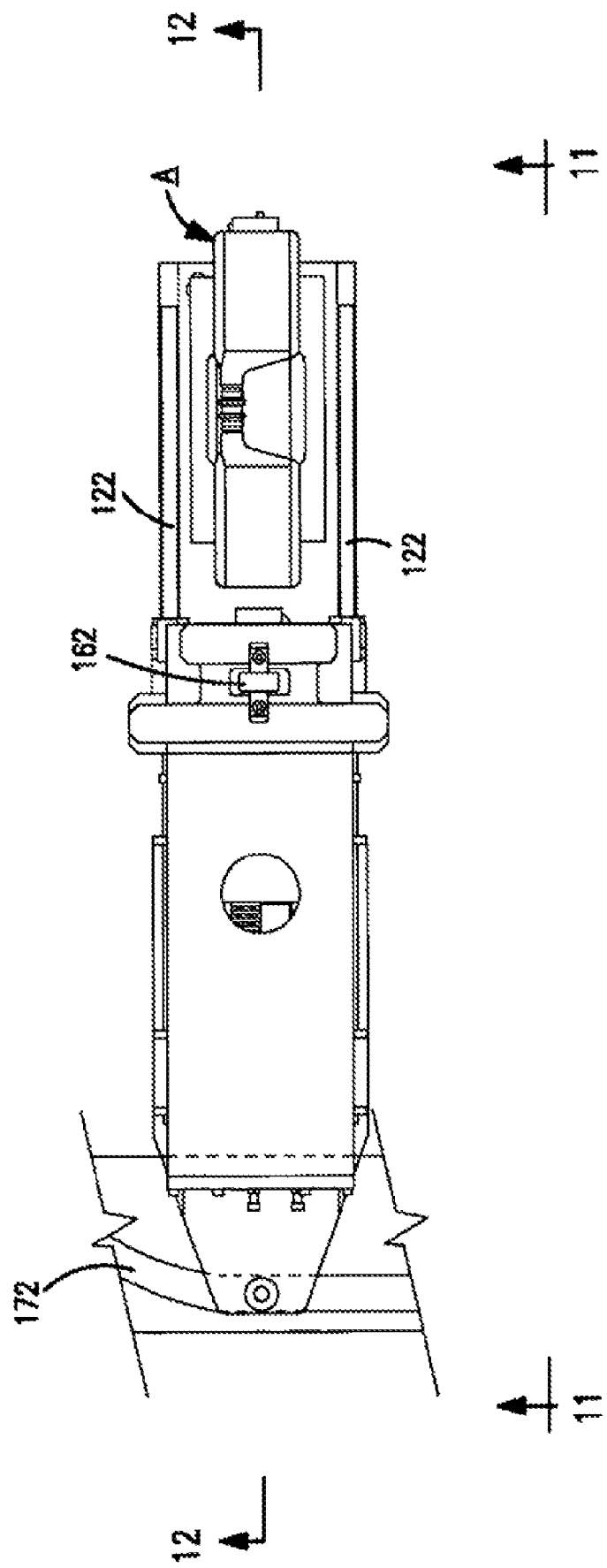
FIG. 10 is a view taken along line 10-10 of FIG. 5.

The position of a log A in a pair of nests 54 is shown in FIG. 9. Each nest 54 includes a flat bottom 56 and two sidewalls 58 extending upwardly from the bottom. The sidewalls have a height less than one-half the thickness of the bottles B. A vacuum cup 60 is located in the bottom of each nest plate.

The nest plates are configured to fit snuggly around the sides and edges of the bottles B in log A. Vacuum applied to cups 60 holds the log in the nest plates. The nest plates hold the logs on wheel 22 and prevent circumferential shifting of the logs. The neck support plate 52 includes a tapered circumferential edge 62 dimensioned to have a snug fit in the shallow recess H between the two ridges on the ends of the neck ring E joining the bottles in each log. Engagement between the edge of plate 52 and the neck ring orients the log A axially when held by the vacuum nests or log holders 54. Vacuum nests 54 and plate 52 assure the log is accurately located circumferentially and axially on wheel 22 during transport from conveyor 32 to wheel 24.

Figure 26:
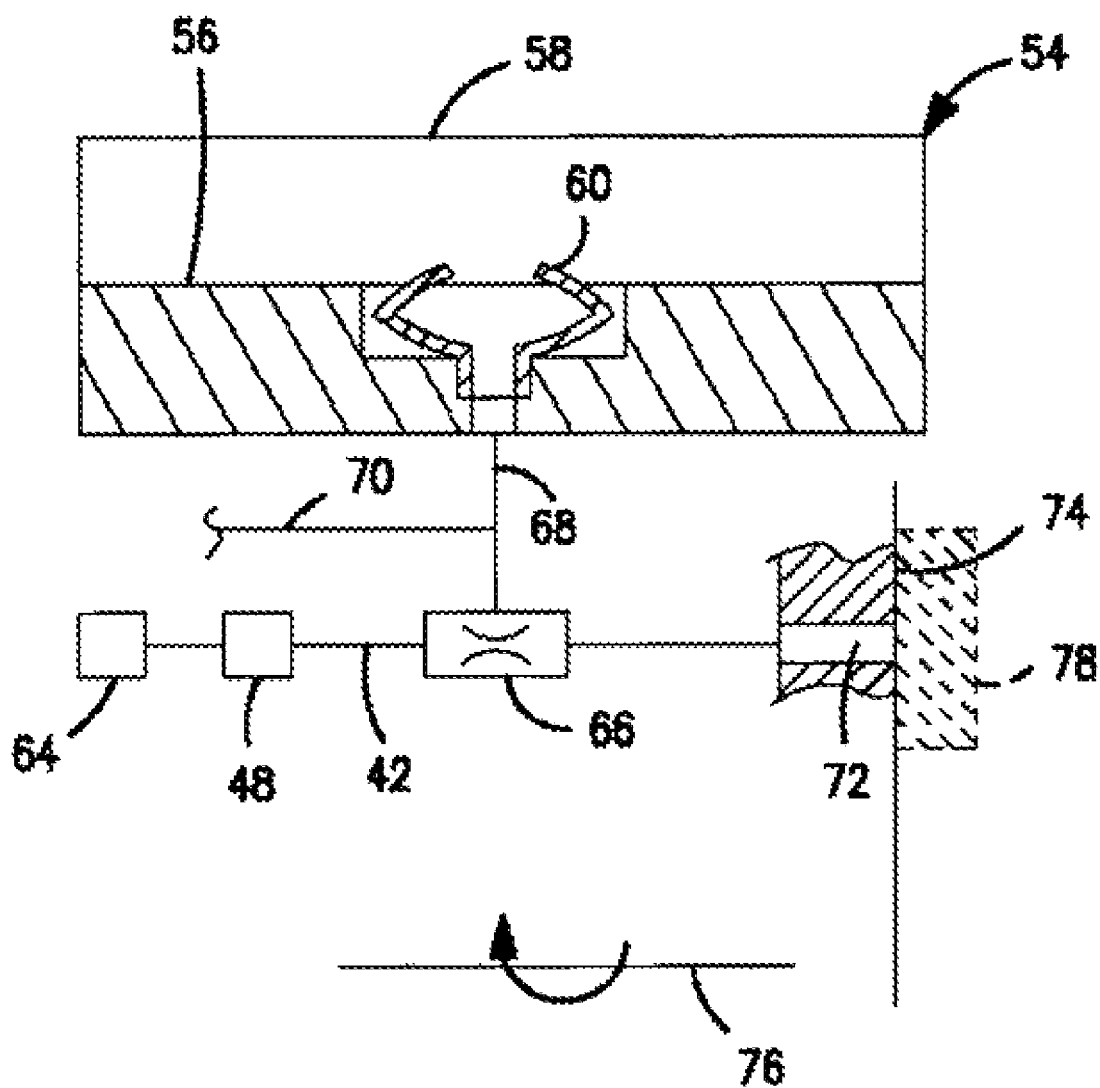
FIG. 26 is a partial sectional view illustrating a control for vacuum seating a bottle in a nest and pressure ejecting the bottle from the nest.

FIG. 26 illustrates a pneumatic circuit for suction cups 60 in each adjacent pair of vacuum nests 54 on wheel 22. Compressed air from a compressed air source 64 flows through rotary fitting 48 and shaft 42 and through an opening of the shaft to a venturi 66. The suction port of the venturi is connected to the two suction cups 60 of an aligned pair of vacuum nests 54 through pneumatic lines 68 and 70. Only one nest 54 is illustrated. The outlet port of the venturi 66 is connected to normally opened discharge opening 72 formed in a surface lying in a radial plate 74 perpendicular to the axis of rotation 76 of wheel 22.

When a log A is transferred from conveyor 32 to wheel 22 opening 72 is unobstructed permitting flow of compressed air through venturi 66 and drawing vacuum through the two suction cups in the two vacuum nests 54 receiving the bottles in the log. When the log is seated in the nests the cups 60 engage the sides of the two bottles and vacuum-hold the log with plate edge 62 in recess E in the nest in proper circumferential and longitudinal orientation, as previously described, during rotation of wheel 22.

When a log held in nests 54 of wheel 22 is rotated up to the position for transfer to wheel 24 opening 72 is moved over a fixed stop plate 78 to prevent flow of compressed air through the venturi. With opening 72 obstructed, compressed air flows through lines 68 and 70 and to the two vacuum cups 60 to blow the log outwardly from the nests 54 and seat the log on adjacent vacuum nests on wheel 24 to complete transfer of the log to wheel 24. After the transfer has been completed, continued rotation of wheel 22 moves opening 72 away from plate 78 to permit flow of compressed air through venturi 66 and reapply vacuum to vacuum cups 60 for vacuum capture of another log from conveyor 32. Plate 78 is illustrated in FIG. 8. Air lines associated with the vacuum cups are not illustrated.

Infeed conveyor 32 is located in trough 80 shown in FIG. 8 and indicated in FIG. 5. Plate 82 is mounted on the piston of an air cylinder 84 attached to the bottom of the outer end of hub 40. Extension of the piston rod moves plate 82 from a retracted position shown in FIG. 8 to a work position obstructing discharge opening 72 of the pneumatic circuit shown in FIG. 26 for the adjacent two vacuum nests 54. During normal pick up of logs from conveyor 32 by wheel 22 cylinder 84 is retracted and plate 82 does not close discharge opening 72. Vacuum is then applied to the vacuum cups in the nests so that the nests pick up the logs fed along the conveyor.

Machine 10 includes sensors (not illustrated) for determining whether tail flash has been trimmed from logs fed along conveyor 32. In the event a log fed along conveyor 32 contains tail flash and actuates a sensor, cylinder 84 is extended to move plate 82 adjacent the discharge 72 for the pneumatic circuits of the nests which would pick up the log. Vacuum is not applied to the nests and the log is fed past the end of the conveyor and falls into trough 80.

Figure 18:
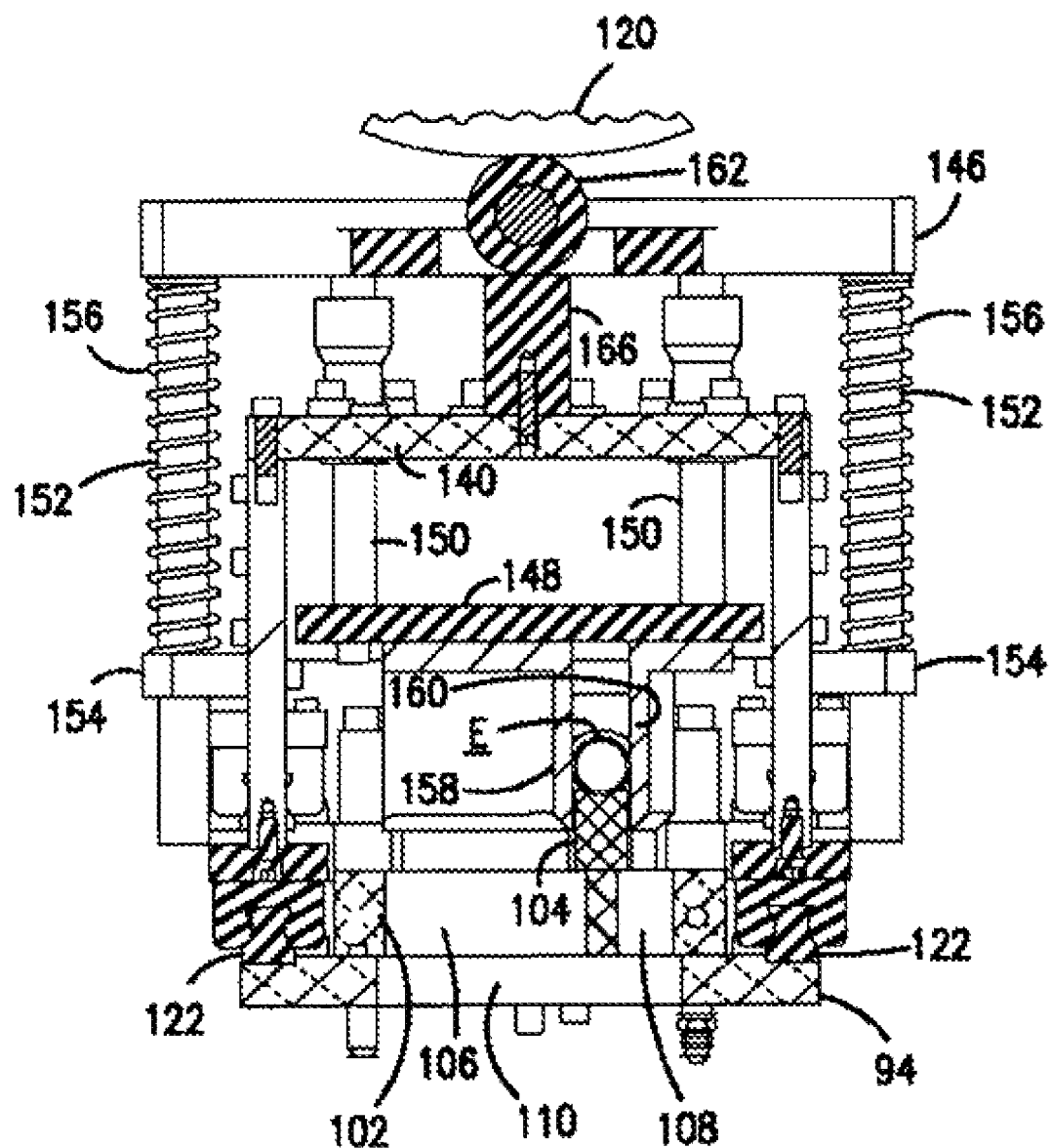
FIG. 18 is a sectional view along line 18-18 of FIG. 17.

Neck flash trim wheel 24 includes a hub 86 mounted on wall 16 and hollow rotary drive shaft 88 journaled bearings in the ends of the hub. A rotary fitting 90 mounted on the inner end of the rotary drive shaft is connected to a source of compressed air which is flowed into the shaft. The outer end of the drive shaft extends outwardly from wall 16 over base 14 and is closed. Three spaced radial support plates 92 are secured to the outer end of shaft 88 above the base and extend radially outwardly from the shaft. Four ninety degree-spaced mounting plates 94 are mounted on plates 92 and extend from plate 92 nearest wall 16 outwardly from the wall and beyond outer most plate 92. Strengthening ring 96 is mounted on the outer end of plates 94. Two vacuum nests 98 are mounted on a plate 102 on the free end of each plate 94 in alignment with the nests 54 of wheel 22. Vacuum nests 98 each include a bottom and sidewalls as in nests 54 and a vacuum cup in the bottom. The adjacent ends of the bottoms of the two nests slope upwardly to provide a tapered ridges 100 conforming to the inwardly sloped upper walls of bottles B in log A transferred to the nests. The nests 98 accurately align logs A circumferentially and longitudinally on wheel 24. The vacuum cups in each pair of nests 98 are connected to pneumatic systems like the system shown in FIG. 26 to apply vacuum to the nests when the nests pick up logs from wheel 24 and to remove the vacuum and apply compressed air to the nests when the logs are transferred from the nests in wheel 24 to the nests in intermediate star wheel 26. A bottle neck and neck ring support 104 shown in FIG. 18 extends between the two nests under the necks C and bottle ring E of log A held on the nests. The top of support 104 conforms to the ridged shape of the bottle necks and neck ring. The support or anvil 104 has a width equal to the diameter of the neck and ring. Flash discharge openings 106 and 108 are formed through plate 102 to either side of support 104 and are located above discharge opening 110 in plate 94.

Figure 11:
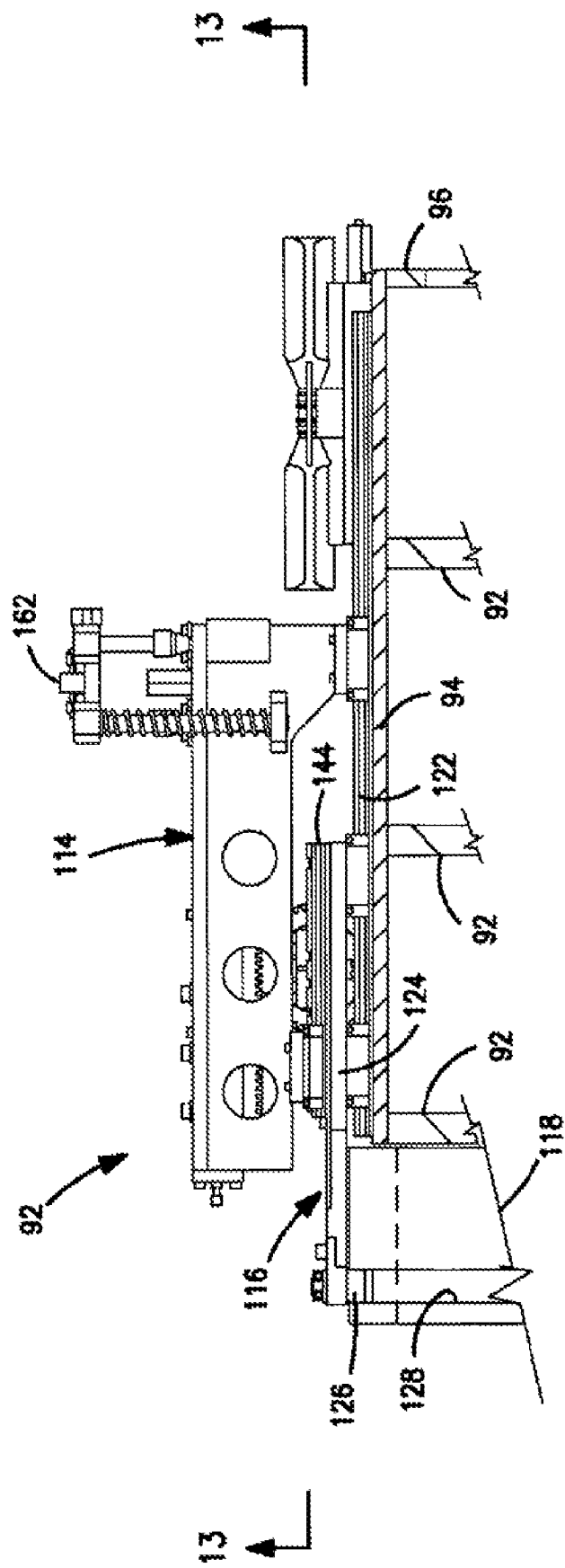
FIG. 11 is a view taken along line 11-11 of FIG. 10.
Figure 12:
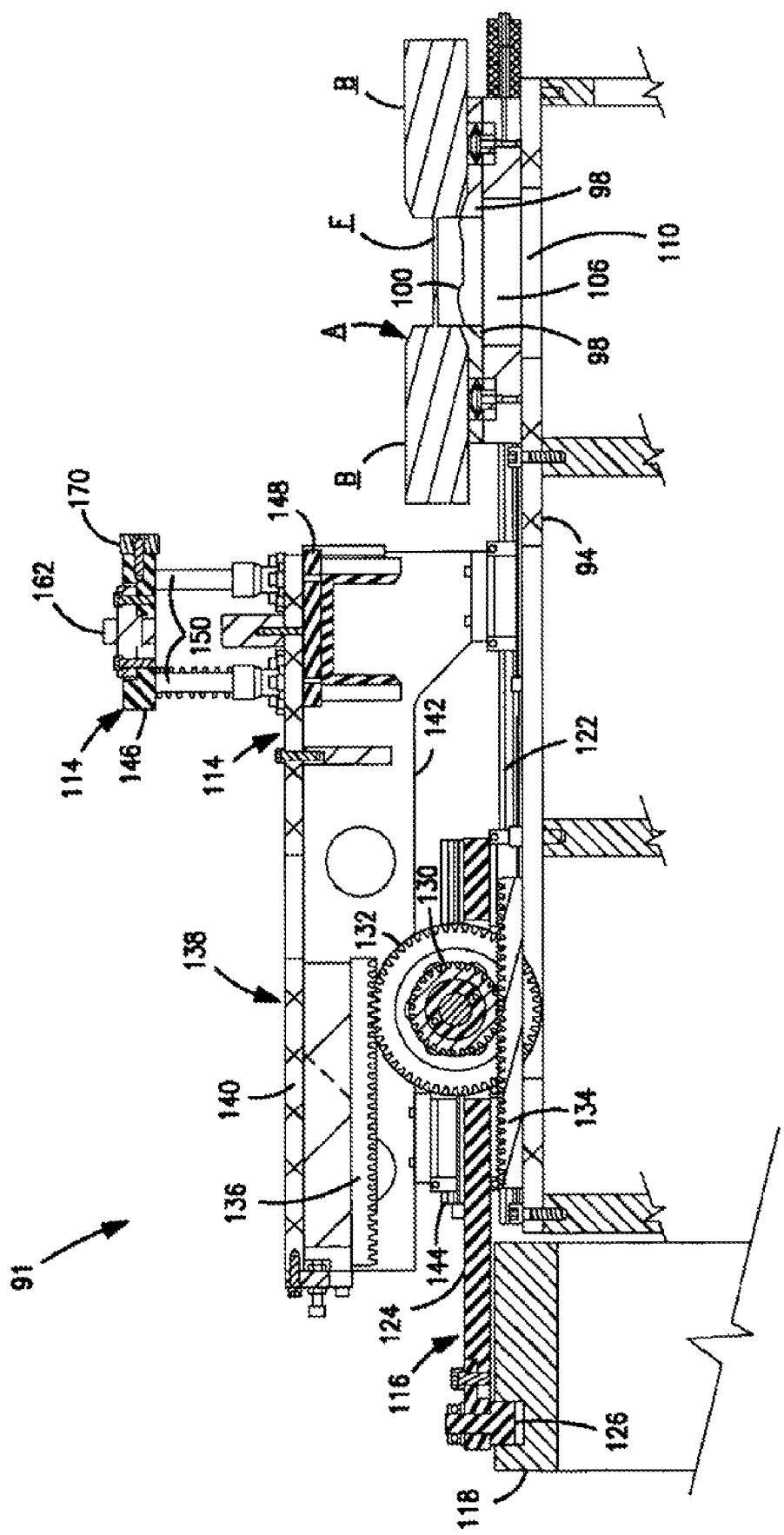
FIG. 12 is a sectional view taken along line 12-12 of FIG. 10.

Wheel 24 includes four sets of flash punch tooling 112 with each set associated with nests 98 on one plate 94. Each tooling 112 includes a flash punch assembly 114 located above plate 94 and a drive assembly 116 for moving the punch assembly from a retracted position where the punch assembly is away from a log held by the nests 98 and adjacent wall 16 as shown in FIGS. 11 and 12 to an extended position with the punch assembly located above the log and away from wall 16. The drive assemblies are moved in and out by fixed cylindrical cam 118 mounted on wall 16. The punch assemblies are actuated by fixed punch cam 120 mounted on wall 16 by rods 199 and located above the nests and punch assemblies 114 when extended.

Two slide rails 122 extend along the sides of each plate 94 from the inner most plate 92 to plate 96. Drive assembly 116 includes a plate 124 located above the inner end of plate 94 and secured to slide rails 122 by suitable bearings for movement along plate 94 in a direction parallel to the axis of rotation of wheel 24. The inner end of plate 124 carries a cam follower 126 fitted in cam groove 128 of fixed cylindrical cam 118. The cross shaft for small diameter gear 130 and large diameter gear 132 is journaled in bearings located on the opposite sides of plate 124. Small diameter gear 130 engages rack 134 on plate 94. Large diameter gear 132 engages rack 136 on support 138 of punch assembly 114.

The flash punch assembly 114 includes a top plate 140 and two like side plates 142 forming U-shaped support 138. The outer end of each side plate 142 carries a bearing engaging a slide rail 122. The inner end of each side plate carries a bearing engaging a slide rail 144 mounted on plate 116. The flash punch assembly 114 includes a punch top plate 146 located above plate 140, a punch lower plate or platen 148 and four guide posts 150 joining the plates together and extending through bearings in support top plate 140. Plate 146 extends laterally beyond the sides of support 138 and is connected to two return posts 152 which extend freely through brackets 154 mounted on support side plates 142. Springs 156 are mounted on posts 152 and confined between the top plate and the brackets. The springs bias the plates 146 and 148 toward an upper position shown in FIG. 12 with plate 148 engaging plate 140.

Figure 13:
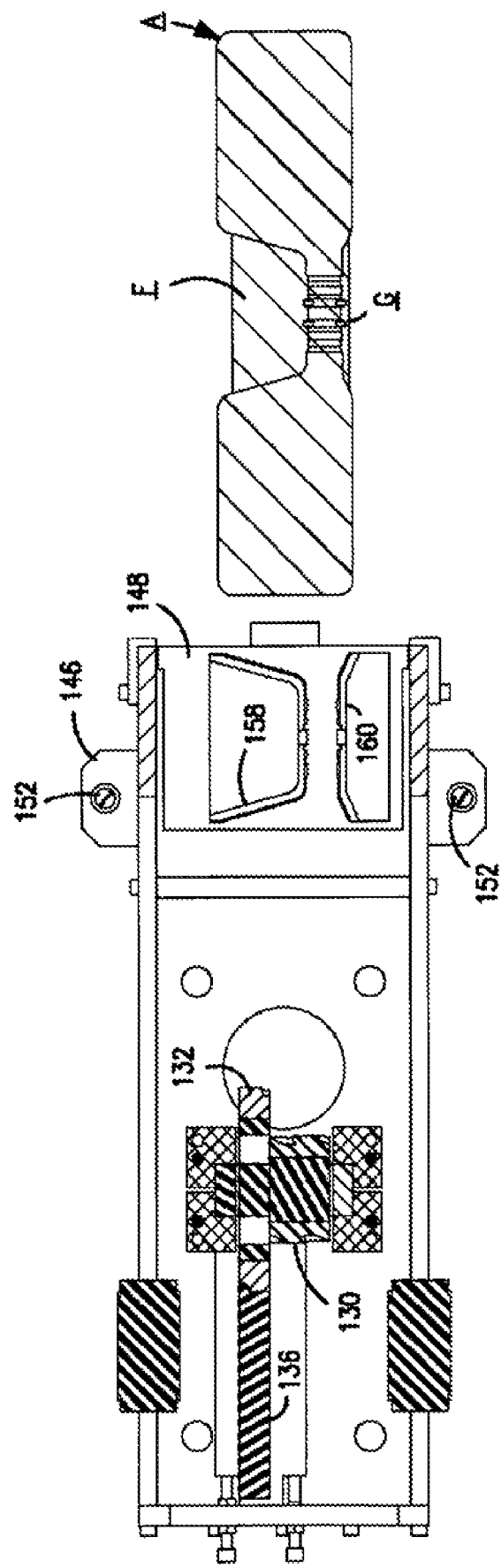
FIG. 13 is a sectional view taken generally along line 13-13 of FIG. 11.

Flash punches 158 and 160 shown in FIG. 13 are mounted on the bottom of punch bottom plate or platen 148. Punch 158 is shaped to punch neck flash F from a log A held on nests 98 and support 104 and punch 160 is shaped to punch neck flash G from the log.

Top plate 146 supports roller cam follower 162 which is engageable with fixed punch cam 120 for moving the punches from a retracted position through a punch stroke to an extended position and, in cooperation with springs 156, for returning the punches back to the retracted position above a log A held on the vacuum nests.

Figure 15:
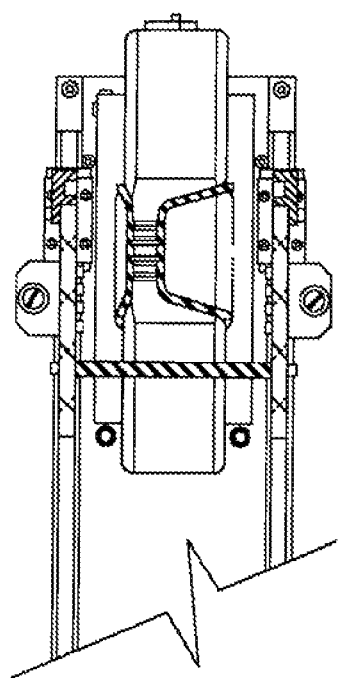
FIG. 15 is a view along line 15-15 of FIG. 14.
Figure 14:
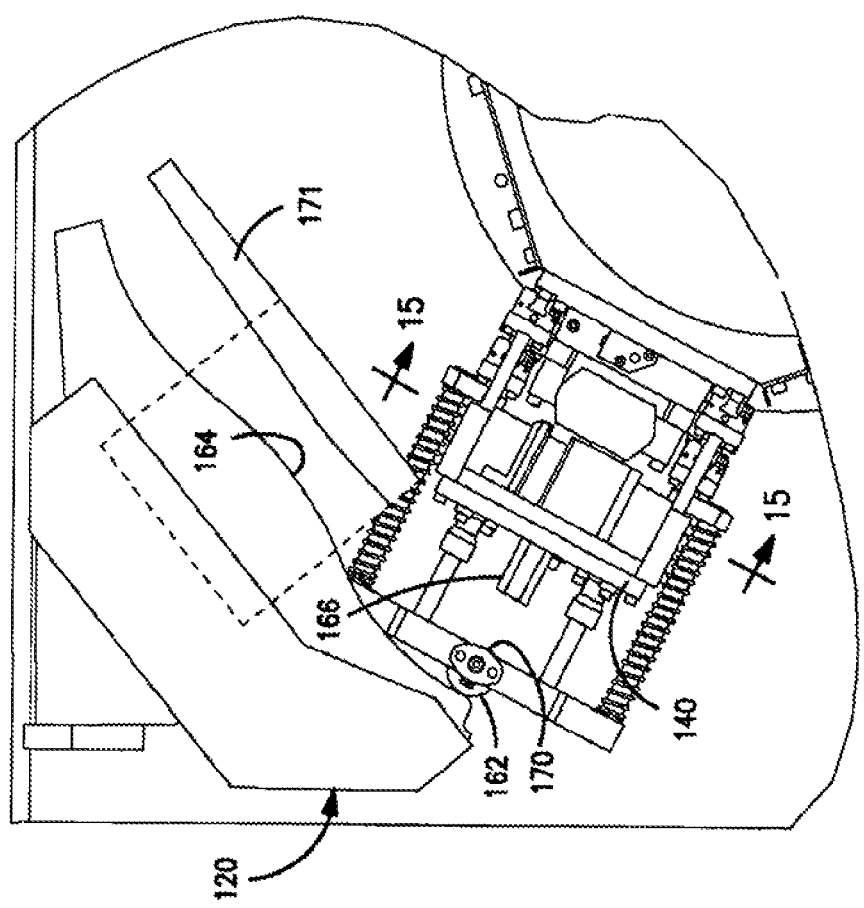
FIG. 14 is a front view of a punch trim assembly.
Figure 17:
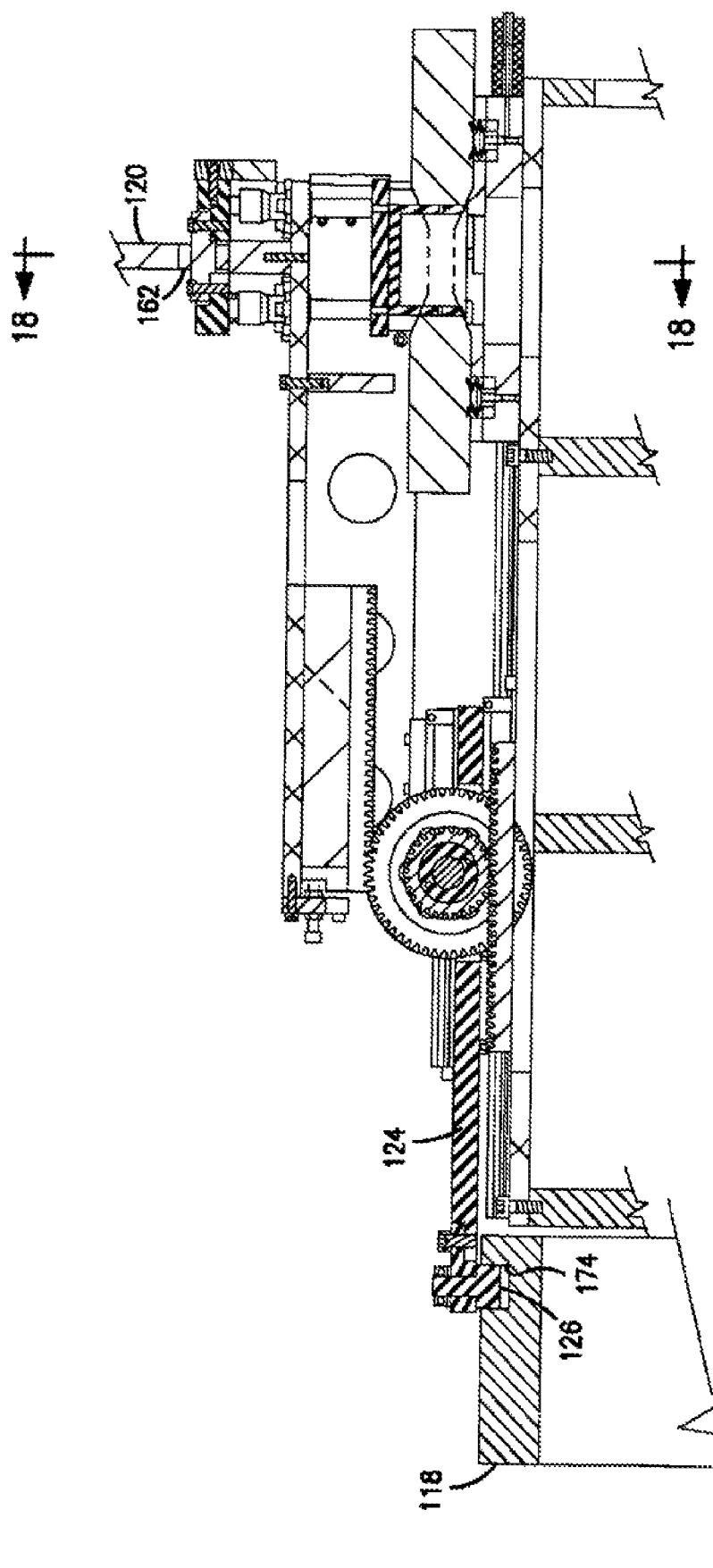
FIG. 17 is a sectional view along line 17-17 of FIG. 16.

Fixed punch cam 120 is illustrated in FIGS. 14 and 15. Rotation of wheel 24 moves successive flash punch tooling 112 in the extended position shown in FIGS. 17 and 18 past cam 120. Roller cam follower 162 engages surface 164 of the cam to move punches 158 and 160 inwardly and trim neck flashes F and G from a log held on the vacuum nests and anvil. After the punch stroke has been completed, springs 156 hold the follower against the continuation of cam surface 164 during an outward or return stroke. Stop 166 on support top plate 140 limits downward movement of the punches. Severed neck flash falls into the interior of wheel 24 for gravity delivery through chute 168 to trough 80. In the event the punch tooling is not returned by the springs rotary follower 170 on top plate 146 engages retraction cam 171 which returns the punches and plates to the retracted position with the punches above the log held on the nests. Additionally, cam 120 is spring loaded in case the tooling 112 jams and prevents lowering of punches 158 and 160 by the cam. In that event, the cam pivots upwardly out of the path of movement of follower 162 and trimmer 10 is shut down.

During transfer of a log A from wheel 22 to 24, as shown in FIG. 2, the flash punch assembly 114 is retracted adjacent wall 16 out of the path of movement of wheel 22. After the log has been vacuum transferred from the nests of wheel 22 to the nests of a tooling assembly on wheel 24 the cam follower 126 for the tool assembly is rotated along a rise portion 172 of cam groove 128 to move the punch assembly to the extended position over the log A held on the vacuum nests before engagement with cam 120. Movement of the punch assembly from the retracted to the extended position is delayed until the assembly has been rotated away from wheel 22. See FIG. 6. As follower 126 moves along rise portion 172 plate 124 is moved outwardly from wall 16, gear 130 is rotated in rack 134 to rotate large gear 132 and rapidly move rack 136 and support 138 from the retracted to the extended position. Continued rotation of wheel 24 moves follower 126 along dwell portion 174 of groove 128 to hold the punch assembly in the extended position during movement past cam 120 and punching of neck trim from the log. After punching has been completed and assembly 112 has moved away from cam 120 the follower 126 moves down a fall portion of groove 128 to move the punch assembly 114 back to the retracted position.

Intermediate star wheel 26 transfers flash-trimmed logs A from the flash punch tooling assemblies 112 of wheel 24 to spin trim tooling assemblies 176 on spin trim wheel 28. Wheel 26 includes four sets of axially spaced vacuum nests 178, like nests 54 of wheel 22 and is otherwise like wheel 22 as previously described. Both wheels 22 and 26 are rotated in a counterclockwise direction as viewed in FIG. 5. Each wheel has four ninety degree-oriented sets of vacuum nests.

The vacuum nests of wheel 26 are provided with pneumatic circuitry as shown in FIG. 26 to facilitate vacuum capture of logs from wheel 24 and air jet release of logs to wheel 28.

Spin trim wheel 28 includes four ninety degree-spaced spin trim tooling assemblies 176 each mounted on a mounting plate 180, like plates 94 in wheel 24, and facing outwardly from the plate. Each plate 180 is mounted on three radially support plates 182, like plates 92 in wheel 24, which are in turn supported by a drive shaft mounted for rotation in a hub on wall 16. A fixed cylindrical cam 184, like cam 118 in wheel 24, surrounds the drive shaft for wheel 28 between the inner most plate 182 and wall 16.

Figure 21:
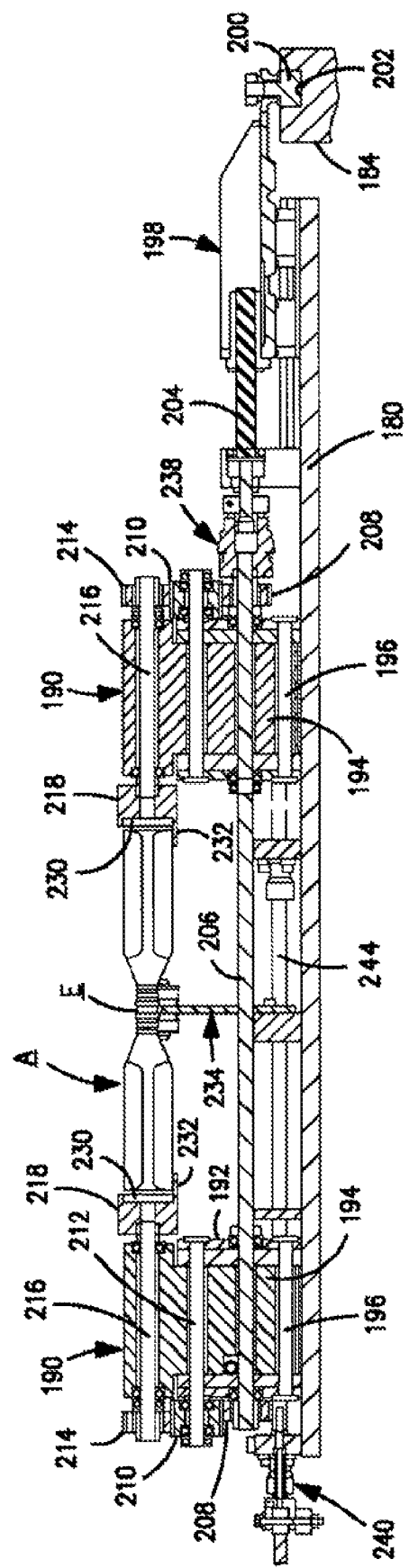
FIG. 21 is a sectional view taken along line 21-21 of FIG. 19.
Figure 22:
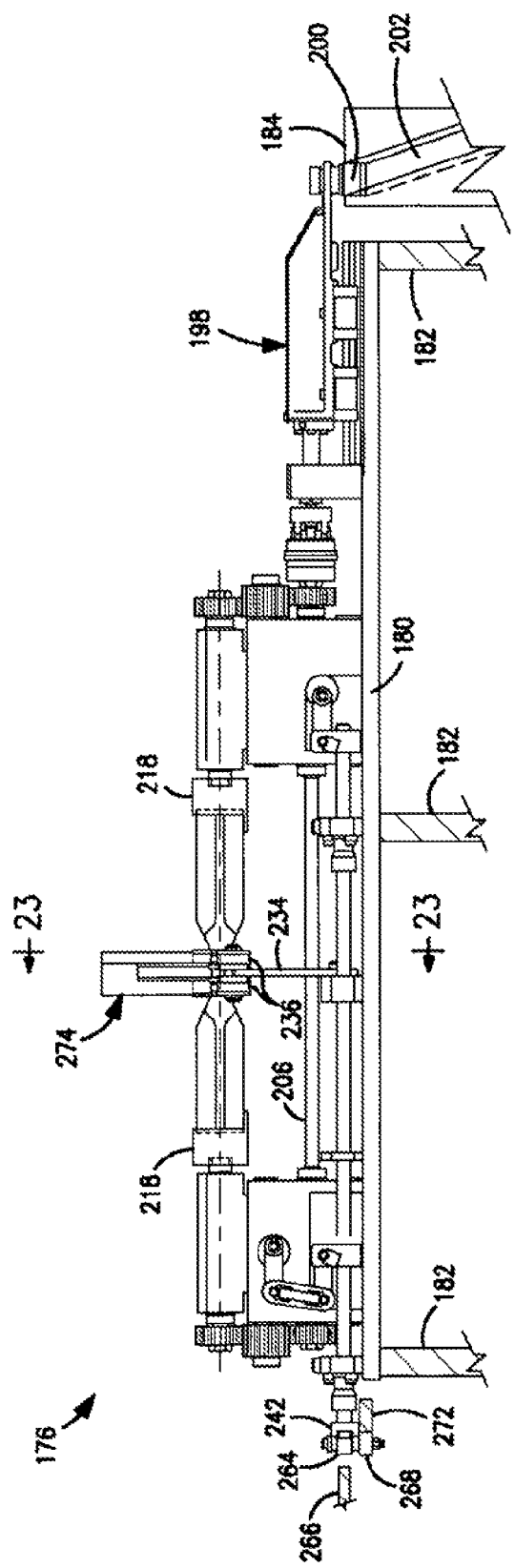
FIG. 22 is a view similar to FIG. 20 with a two-bottle log held in the spin trim assembly.

Each assembly 176 includes two like spin units 190 each having a hollow housing 192 mounted on plate 180 with a slide body 194 located in the housing and extending above the housing. The slide bodies have limited longitudinal movement within the housings in a direction parallel to the axis of rotation of wheel 28. In FIGS. 19-21 the bodies are separated. In FIG. 22 the bodies are moved together to capture a log. The slide bodies are held in the housings on rods 196 extending through the bodies and the ends of the housings.

Screw nut 198 is mounted on guide rails on the inner end of plate 180, adjacent wall 16. A cylindrical cam follower 200 is mounted on the screw nut and is fitted in cam groove 202 extending around cam 184. The screw nut includes a rotary output shaft 204 which is connected to rotary drive shaft 206 extending through both spin units 190. A drive gear 208 is mounted on shaft 206 on the outside of each spin unit as shown in FIG. 21. Each gear 208 engages an idler gear 210 mounted on shaft 212 extending through assembly 190 and a driven gear 214 mounted on shaft 216 extending through the upper portion of a slide body 194, above housing 192. In each spin unit 190, a bottle retention cup or log holder 218 is mounted on the inner end of each shaft 216 and faces the bottle retention cup 218 on the other spin unit 190. Each cup 218 includes a rectangular recess 230 dimensioned to be extended over the bottom I of a flash-punched log A positioned by wheel 26 between the cups when retracted as in FIG. 21. The cups each include a ledge 232 extending outwardly from the recess to 230 for supporting the log when placed between the open or retracted cups.

Figure 23:
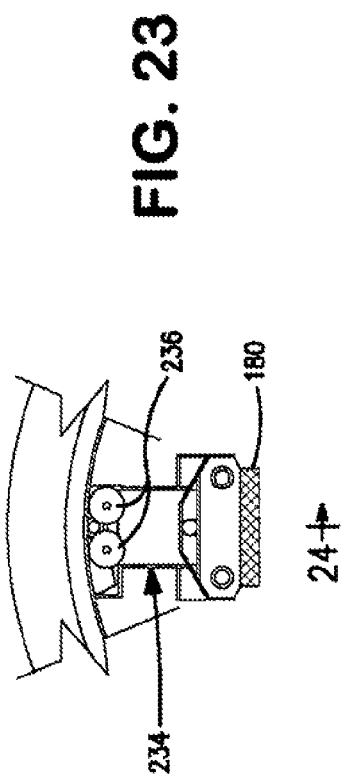
FIG. 23 is a sectional view taken generally along line 23-23 of FIG. 22.
Figure 24:
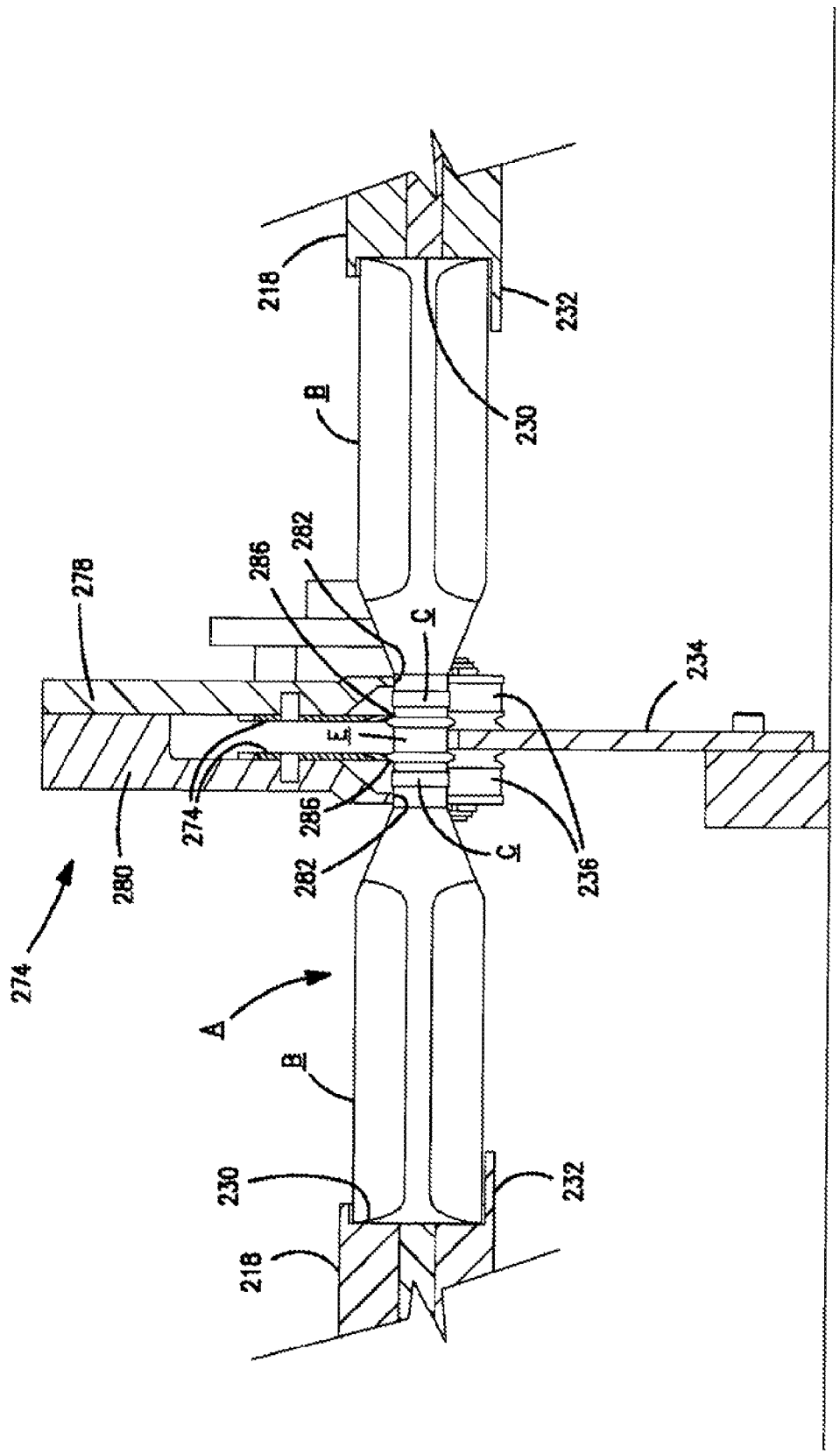
FIG. 24 is a sectional view along line 24-24 of FIG. 23.

Each assembly 176 includes a bottle neck support 234 for the necks C of the bottles in the log in the assembly. The neck support is mounted on plate 180 and includes a pair of support rollers 236 located under the neck of each bottle in the log held in the assembly so that the bottle necks and the neck ring joining the bottle necks are supported as shown in FIGS. 23 and 24. The tops of the necks and the neck ring extend above the rollers to permit spin trimming of the ring away from the necks.

Shafts 216 rotate bottle retention cups 218. As shown in FIG. 19, the recesses 230 in which the bottoms of the bottles in log A are seated are offset to one side of the shafts 216. When log A is held in cups 218, the neck axis D of the log coincides with the axis of shafts 116. Rotation of the shafts rotates the log about offset axis D for cutting away of neck ring E.

Trimmer 10 may be used to trim neck flash and neck ring from logs having bottles with the bottle necks located equidistant between the bottle sides, rather than offset. In this case, the anvils and punches of tooling 112 would be located centrally. In assembly 176 the recesses 230 would be located centrally with regard to neck support 234, rather than offset as shown in FIG. 19.

The screw nut 198, drive shaft 206, gears 208, 210 and 214 and shaft 216 form a drive 238 for rotating a bottle or log retention cups 210 during trimming away of neck ring E. Drive 238 is actuated by fixed cam 184.

Cup opening and closing drive 240 is operated by fixed cams on plate 186. The drive includes cam follower support 242 located on the end of assembly 186 away from wall 16 and mounted on the outer ends of two shift rods 244. Each rod is mounted on one end of support 242 and extends longitudinally along the assembly 176 past the outer spin assembly 190 and to inner assembly 190. See FIG. 20. The rods extend through rod supports 246 mounted on plate 180. A block 248 is attached to the inner end of each rod 244 and supports a link 250 which is connected to the slide body in the inner unit 190 through opening 252 formed in housing 192. A block 254 is attached to each rod 244 adjacent the outer unit 190 and is connected to the lower end of pivot arm 256 by link 258. The upper end of the pivot arm is connected to link 260 which in turn is connected to the slide body 194 in housing 192 through opening 262. The center of the pivot arm 256 is pivotally mounted on housing 192.

FIGS. 19-21 show assembly 176 with cups 218 spaced apart in an open position. Cam follower support 242 is located in an inner position. Movement of the support 242 outwardly, away from wall 16, moves rods 244 outwardly. The slide body 194 in the inner or distal spin unit 190 is pulled outwardly by outward movement of links 250. The slide body in the outer or proximal spin unit 190 is pushed inwardly the same distance the other slide body is pulled outwardly by rotation of pivot arms 256 and inward movement of links 260. During movement of the slide bodies toward each other gears 214 slide along idler gears 210 while retaining engagement with the idler gears. The closing movement of the two cups 218 moves recesses 230 onto the ends of a log A supported on ledges 232 to capture the log in assembly 176 with log axis D aligned with the axis of shafts 216 which rotate the cups and log. See FIGS. 22 and 24.

Rotary cam follower 264 is located on the center of support 242 between rods 244 and faces outwardly toward plate 186. Follower 264 engages a rotary cam 266 on plate 186 to move the cups from the closed, log-engaging position shown in FIG. 22 to the open position of FIGS. 19 and 20 permitting placement or removal of logs between the cups.

Spring 268, shown in FIG. 19, is attached between follower support 242 and support 246 mounted on the outer end of plate 180. The spring 268 is compressed and biases the support 242 outwardly, away from wall 16 to position cups 218 together in a closed position holding a log in place on assembly 176 with log axis D aligned with the spin axis of shafts 216.

Support 242 carries a second follower 270 and plate 186 carries a second fixed cylindrical cam 272 located between follower 270 and plate 180. During normal operation of assemblies 176 spring 268 moves the cups together to capture logs and cam 272 performs no work. Cam 272 moves the cups together if spring 268 fails to close the cups.

Figure 25:
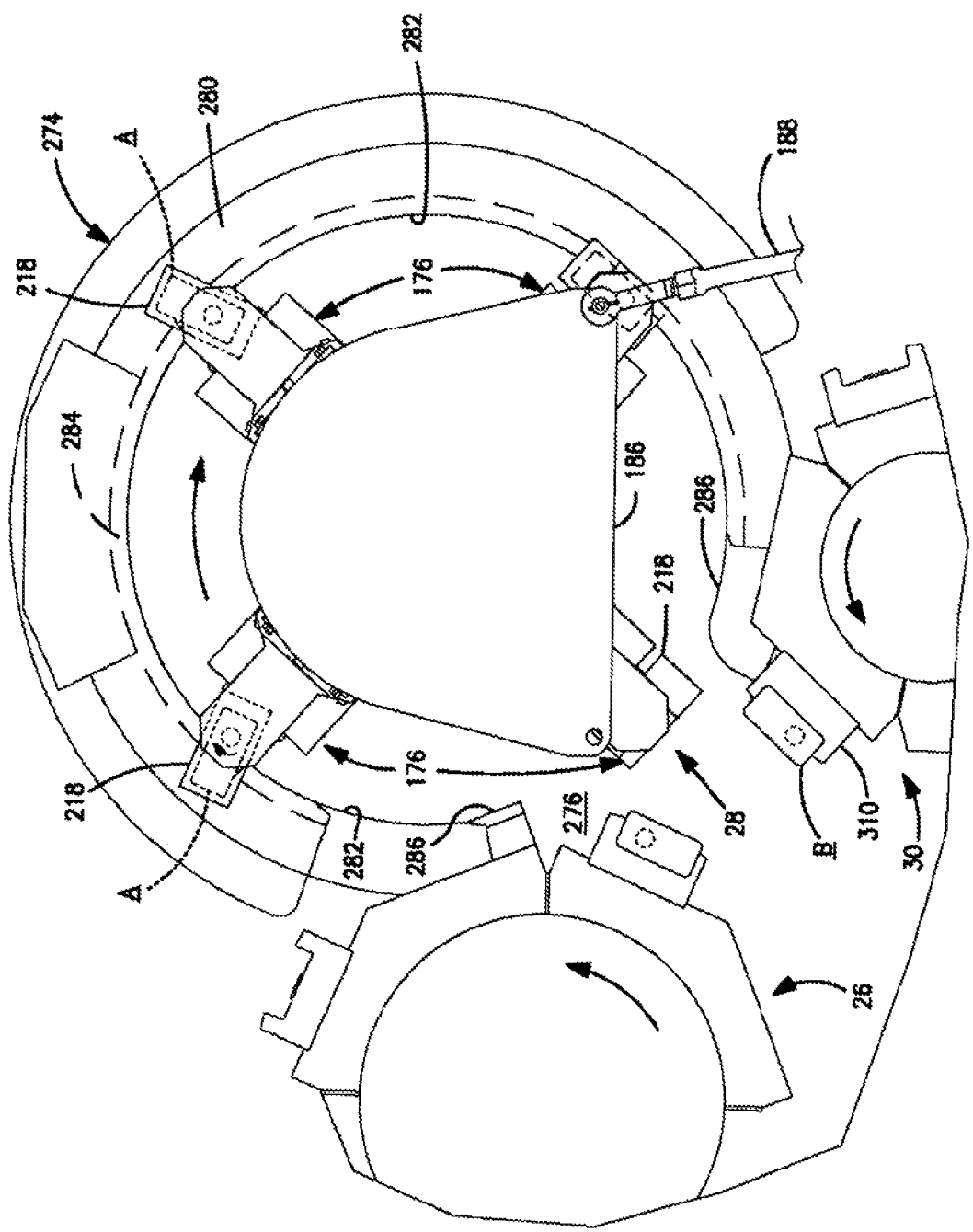
FIG. 25 is a front view of the spin trim wheel.

Two-blade cutter assembly 274 is mounted on wall 16 and partially surrounds wheel 28, as shown in FIG. 25. Logs trimmed with neck flash removed are delivered to assemblies 176 in wheel 28 in the gap 276 between the ends of the cutter assembly. The assembly cuts away the neck rings E of the logs carried by spin trim assemblies 176. The resultant individual bottles are delivered from assemblies 176 to vacuum nests of takeaway wheel 30.

FIG. 24 illustrates the position of a log A, with neck flash previously trimmed away, held between closed cups 218 during spin trimming. Assembly 274 includes circumferential plates 278, 280 which extend nearly completely around wheel 28 leaving gap 276. Each plate 278, 280 includes an inner hold down edge 282 which engages the neck C of a bottle B held in assembly 176. During spin trimming, each bottle B in log A is held in place by a cup 218, two support rollers 236 and one edge 282.

Cutter assembly 274 includes two circumferential cutting blades 284 having sharpened inner edges 286 which engage and spin cut the logs held in assemblies 176 at the junctions between the bottle necks B and neck ring E.

A log held in vacuum nests on wheel 26 is rotated between open bottle retention cups 218 of one of the rotating assemblies 176 of wheel 28. When the log is in place, cam follower 264 is rotated to a fall surface on cam 266 and spring 268 moves cups 218 together to seat the ends of the bottles in recesses 230. At the same time, the vacuum holding the bottles in the nests on wheel 26 is reversed and compressed air is flowed through the suction cups in the nests to release the log from the vacuum nests. Rotation of wheel 28 moves the confined log under hold down surfaces or edges 282 of plates 278, 280 to confine the bottle necks between rollers 236 and the plates. Rotation of wheel 28 moves cam follower 200 along a sloped surface in cam groove 202 to drive screw nut 198 outwardly from wall 16 along shaft 204 to rotate the shaft so that the drive shaft 216, cups 218 and held log A are spun around neck axis D two revolutions in a first direction. The cam follower 200 then is moved along a reverse slope section of cam groove 202 to retract the screw nut and spin the log A on assembly 176 two revolutions in a second, reverse direction.

Rotation of assembly 176 holding the log and spinning of the log as the log is rotated around wheel 28 moves the neck portions of the spinning log into engagement with cutting edges 286 of blades 284 to trim the neck ring E from the two bottles B.

In the embodiment disclosed, screw nut 198 spins log A two revolutions in each direction as the log is spun in engagement with blades 284. The number of rotations per inner and outer stroke of the nut screw may be adjusted as required. Additionally, the shape and lead end of edges 286 may be adjusted as required for optimum cutting away of the neck ring. The blades may be brought into gradual engagement with the sides of the bottle neck for gradual cutting as the bottles are spun along the cutting blades. Alternatively, the blades may include a portion which initially punctures the thickness of the bottle necks and then cuts the entire thickness of the neck is spun around axis D.

The log is held in a known position in cups 218. The thickness of the plastic at the part lines extending across the neck ring may vary. The cutting edges 286 may have a geometry selected for optimum cutting of the plastic at the bottle necks dependent upon circumferential variation in thickness of the plastic.

Figure 7:
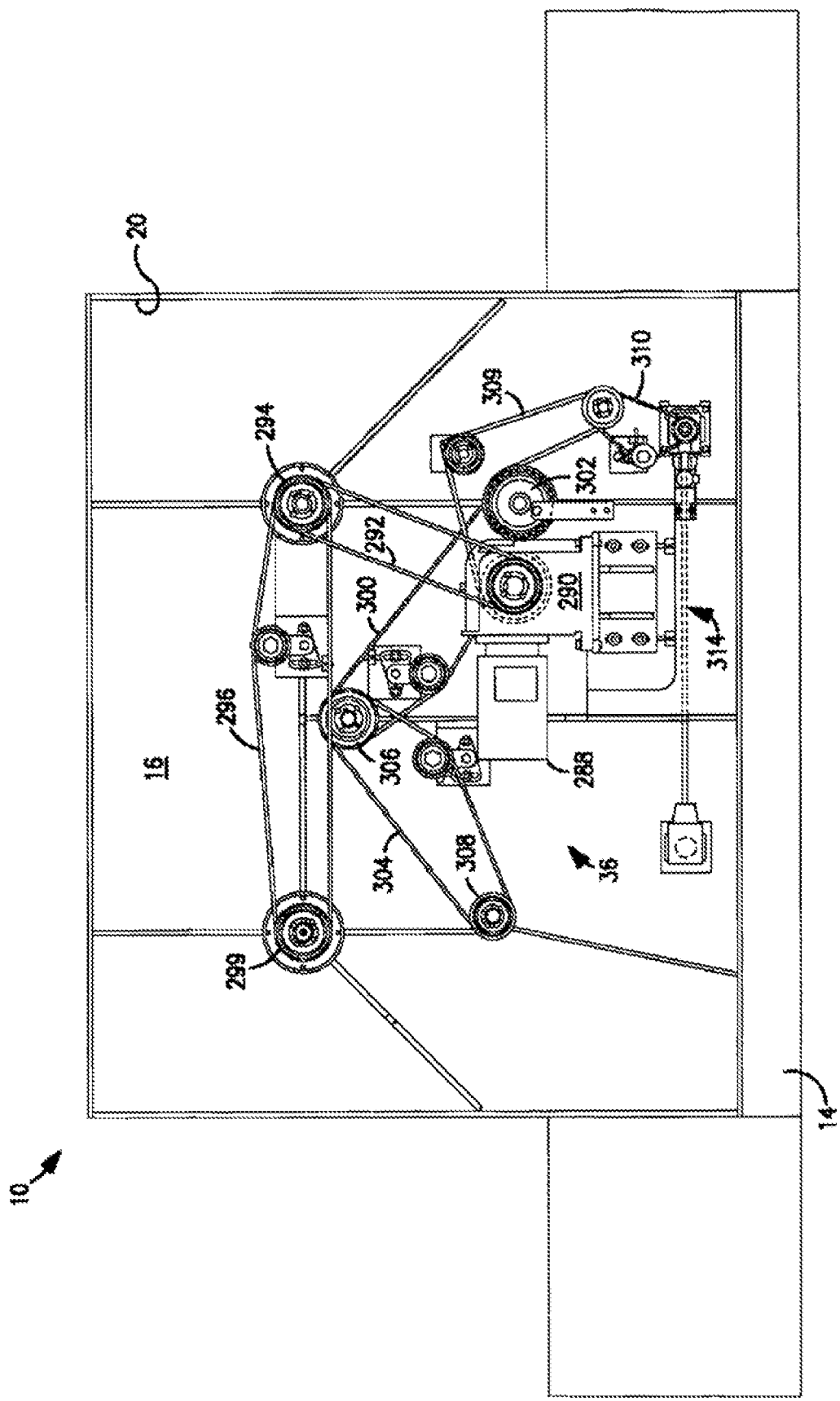
FIG. 7 is a back view of the bottle trimmer shown in the direction of arrow 7 in FIG. 6.

FIG. 7 illustrates the drive system 36 for trimmer 10. The system includes an electric motor 288 connected to a transmission 290 mounted on wall 16. The transmission has an output shaft supporting pulleys adjacent the wall and remote from the wall. Drive belt 292 engages a pulley on the output shaft and pulley 294 mounted on the inner end of drive shaft 88 for wheel 24. Drive belt 296 engages a second pulley 298 on the inner end of shaft 88 and pulley 299 on the inner end of the drive shaft for wheel 28.

Belt 309 is wound around a pulley mounted on the transmission output shaft, drive pulley 302 on drive shaft 42 for wheel 22 and a take off pulley 311 for the infeed screw conveyor drive. Belt 300 is wound around a second pulley 306 on the inner end of the drive shaft 42 and pulley 306 on the inner end of the drive shaft for wheel 26. Belt 304 is wound around a second pulley on the drive shaft for wheel 26 and small diameter pulley 308 on the drive shaft for wheel 30.

Infeed conveyor 32 is driven by belt 309. Discharge conveyor 34 is driven by belt 310 and rotary shaft drive 314 extending across the back of wall 16 under the motor and transmission.

The pulleys on the inner ends of the drive shafts for wheels 22, 24, 26 and 28 are the same diameter. Each of these wheels carries four ninety degree-spaced assemblies or vacuum nests and rotates at the same speed, although as illustrated in FIG. 5, wheels 22 and 26 rotate counterclockwise and wheels 24 and 28 rotate clockwise. Wheel 30 carries three sets of vacuum nests. The pulley 308 for rotating wheel 30 is smaller than the pulleys rotating the other wheels and rotates wheel 30 at a speed one-third faster than the speed of rotation of other wheels so that the vacuum nests on wheel 30 capture trimmed bottles delivered from wheel 28 having four spin trim assemblies 176.

The operation of bottle trimmer 10 will now be described by describing the operations performed on a log A placed on infeed conveyor 32 after tail flash has been removed from the ends of the two bottles in the log.

Conveyor 32 conveys log A downstream at a speed which locates the log under a pair of vacuum nests 54 on wheel 22. The wheel rotates to position the nests over the two bottles in the log as illustrated in FIG. 1. Compressed air is flowed through the circuit of FIG. 26 for the nests to draw vacuum through cups 60 and vacuum-hold the log in the nests. The log is held accurately in place by the nests and edge 62.

The infeed conveyor 32 includes sensing means (not illustrated) to detect untrimmed tail flash on log A. In the event tail flash has not been trimmed from the log, air cylinder 84 is shifted to close the discharge opening 72 for the pneumatic system for the nests so that compressed air is flowed through the vacuum cups and the log is not captured in the nests, remains on the infeed conveyor and is discharged into trough 80.

A log held in vacuum nests in the wheel 22 is rotated counterclockwise as shown in FIG. 5 up to wheel 24 and is transferred from nests 54 on wheel 22 to nests 98 on wheel 24. The two nests are rotated together at the 12 o'clock position for wheel 22 and the 6 o'clock position for wheel 24. Compressed air is blown through the vacuum cups of nests 54 and vacuum is applied to nests 98 at transfer. As illustrated in FIG. 8, the flash punch assembly 114 associated with nests 98 receiving the log is in the retracted position adjacent wall 16 and out of the path of movement of wheel 24 during transfer of the log. After transfer of the log to vacuum nests at the 6 o'clock position on wheel 24, continued clockwise rotation of the wheel rotates the log and moves cam follower 28 along a rise surface of fixed cam 118 to actuate drive assembly 116 and move flash punch assembly 114 from the retracted position of FIG. 12 to an extended position where punches 158 and 160 are located above the neck portion of the log. The flash punch assembly is fully extended before the wheel rotates the assembly into engagement with cam 120.

Figure 16:
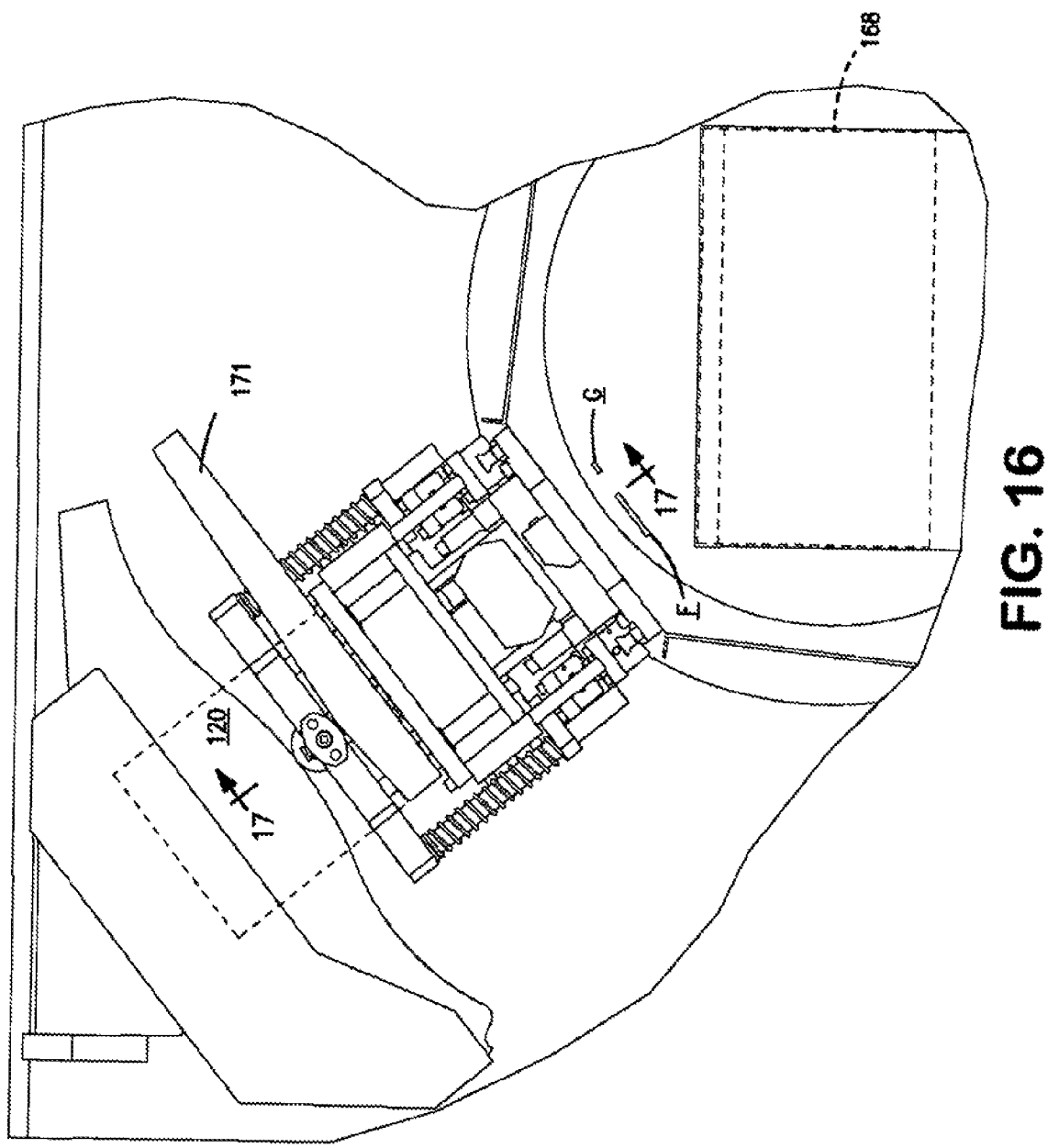
FIG. 16 is a view like FIG. 14 showing the punch assembly fully collapsed.

As the wheel continues rotation in a clockwise direction, follower 162 engages surface 164 of cam 120 to lower punches 158 and 160 and trim flash F and G from log A. As shown in FIG. 16, neck flash is trimmed from the log when the log is located at the upper portion of the path extending partially around wheel 24. The trimmed flash gravity falls into the hollow interior of wheel 24. The punches 158 and 160 rotating on wheel 24 and move downstream along the path of movement of the log during punching. Chute 168 extends into the interior of the wheel, receives the trimmed flash and guides the gravity-fall of the flash into trough 80.

After punching, continued rotation of wheel 24 moves follower 162 down cam surface 164 to raise the punches above the log. When punch assembly 114 has been rotated clear of the cam a fall surface on cam 128 retracts the flash punch assembly from the extended position to the retracted position before wheel 28 rotates the flash-trimmed log to position for transfer to vacuum nests 178 of wheel 26. Vacuum is supplied to nests 178 and compressed air is flowed through the vacuum cups of nests 98 to complete the transfer.

The flash-trimmed log is carried by nests 178 on wheel 26 to gap 276 between the ends of the cutter assembly 274 partially surrounding wheel 28. When moved into the gap the log is seated between two separated or open bottle retention cups 218 of a spin trim assembly 176. The log rests on ledges 232. The neck C of each bottle rests on two rollers 236. See FIGS. 19-21. Immediately after wheel 26 positions the log A on assembly 176 rotation of wheel 28 moves cam follower 264 down a fall surface of cam 266 so that spring 268 moves the bottle retention cups 218 together to capture the ends of the bottle and hold the bottle for spin trimming. Upon continued rotation of wheel 28 neck C of each bottle in the log is held between two rollers 236 and the hold down surface 282 of one of plates 278 and 280. After the log has been captured as described, follower 200 moves down a surface in cam groove 202 to move screw nut 198 first away from wall 16 and then back toward wall 16 to spin the log first two revolutions about axis D in a first direction and then spin the log back two revolutions about the axis in the opposite direction. Trimming occurs as wheel 28 rotates the log along edges 286 of blades 284 to sever neck ring E from bottle necks C. After the neck ring has been severed, the individual trimmed bottles B are held in place on the spin trim assembly 176 between cups 286 and rollers 236 and plates 278 and 280.

After spin trimming continued rotation of wheel 28 moves the trimmed bottles into engagement with vacuum nests 312 on wheel 30. Follower 264 rides up a rise surface on cam 266 to retract or move apart cups 218 and release the trimmed bottles after the bottle necks have moved past the downstream ends of plates 278 and 280. The released bottles are vacuum drawn into nests 312 and are rotated by wheel 30 down onto takeaway conveyor 34. When above the conveyor, vacuum is released and compressed air is blown through the suction cups to transfer the bottles from the nests 312 to the conveyor for takeaway as illustrated.

Figure 27:
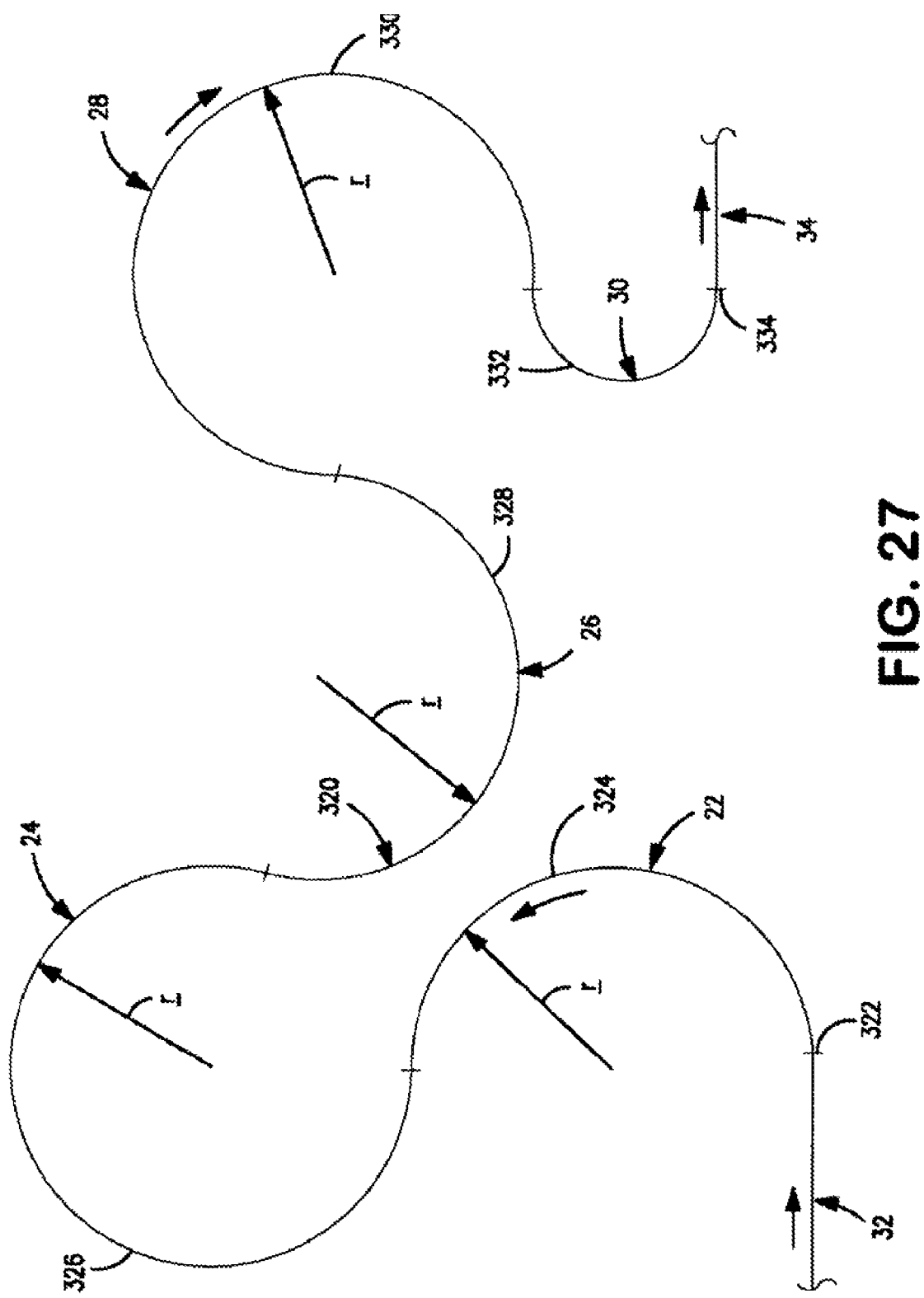
FIG. 27 illustrates the path of movement of a log through the trimmer.

Bottle trimming machine is designed to operate at a high production speed of about 200 logs per minute with an output of 400 trimmed bottles per minute. The machine accurately holds the logs and bottles in place on each of the wheels during movement of the logs, and subsequently trimmed bottles, along a continuous arcuate path 320 at a constant speed. FIG. 27 illustrates the path of movement of log A from infeed conveyor 32 to discharge conveyor 34.

Arcuate path 320 extends from infeed end 322 where the log is picked up by wheel 22 from conveyor 32 and extends continuously around arcuate portions 324, 326, 328, 330 and 332 on wheels 22, 24, 26, 28 and 30 respectively to discharge point 324 where the trimmed bottles are placed on discharge conveyor 34. Wheels 22, 24, 26 and 30 support the logs and bottles in nests or in spin trim assemblies located a distance r from the axis of rotation of the wheel. Wheels 22, 24, 26 and 28 are rotated at the same circumferential speed so that the logs are moved along path 320 at the same speed. The radius of wheel 30 is less than r. Accordingly, wheel 30 is rotated more rapidly than the other wheels so that the trimmed bottles carried by wheel 30 are moved along the downstream portion of the path 320 at the same speed the logs are moved along the portion of the path upstream from wheel 30. The logs are held on the wheels 22, 24, 26 and 28 with the neck axes D extending transversely to the direction of movement along path 320 and parallel to the rotational axes of the wheels. The neck axes of the bottles carried by wheel 30 parallel the axis of the wheels.

The punches 158 and 160 in flash punch assembly 112 move along the path with the logs during punching or trimming away of neck flash. In disclosed machine 10, the flash punch assemblies 114 are retracted away from the logs when the logs are transferred from wheel 22 to wheel 24. Then, the punch assemblies are extended parallel to the axis of rotation of wheel 24 and perpendicular to the path 320 to a position over the logs where neck flash is trimmed away from the logs.

If desired, wheel 24 could be modified to have flash punch assemblies which are permanently located in the position of the retracted punch assemblies of machine 10 disclosed herein and the wheel could include drive assemblies which shift the vacuum nests 98 holding the logs in place across the path in a direction parallel to the axis of rotation of the wheel to position the logs under the punch assemblies for trimming. After trimming, the trimmed logs would be shifted back to their original positions for transfer to wheel 26. During such a punching operation, the logs are moved downstream along path 320 at a continuous speed but are shifted laterally, punched and then shifted back.

As the logs are rotated along the path on wheel 28 the logs are spun along the neck axis and engage fixed cutting blades to trim away neck rings between the bottles in the log. Spin trimming of the neck rings is preformed without altering the movement of the logs, and then bottles, along the path.

The vacuum nests on wheels 22, 24 and 26 accurately locate the logs on the wheels during continuous movement along the path. Spin trim assemblies 176 accurately locate the logs during movement around wheel 28. Finally, vacuum nests 312 on wheel 30 accurately locate the trimmed bottles on wheel 30 during transport from wheel 28 to the discharge conveyor 34.

A set of four vacuum nests or log holders 54 is provided on wheel 22. A set of four vacuum nests or log holders 98 is provided on wheel 24. A set of four vacuum holders or nests 178 is provided on wheel 26. A set of four pairs of cup holders or log holders 218 is provided on wheel 28. A set of three vacuum nests or log holders 312 is provided on wheel 30. During downstream movement of logs along path 320 the log holders on each wheel are repetitively moved downstream along the second of the path defined by the wheel and carry logs downstream along the path. The wheels move the logs continuously downstream along the path during trimming as described. Each wheel 22, 24, 26, 28 and 30 is a feed conveyor which repetitively moves logs downstream along its respective portion of the path. Accurate location of the logs on the wheels assures that flash trimming and spin trimming is performed at proper locations on the logs and improves the quality of the trimmed bottles. Trimmed bottles are discharged at regularly spaced known intervals on discharge conveyor 34 in position for downstream operations.

The wheels 22, 24, 26, 28 and 30 are cantilevered on wall 16 and extend outwardly from the wall. This arrangement permits the compact machine design and facilitates worker access to the wheels and to drive system 36 during set up and servicing. Path 320 with joined counterclockwise and clockwise sections is compact and reduces the size of the trimmer and auxiliary conveyors.

Wheels 22, 24, 26 and 28 have four ninety degree spaced stations. If desired, the throughput of the machine may be increased by doubling the number of stations on each wheel without appreciably increasing the size of the machine. Doubling the stations would increase the throughput from 200 logs per minute to 400 logs per minute and 800 bottles per minute.

In wheel 24 the punch tooling for removing neck flash moves down along the path 320 with the logs, permitting extension of the tooling for trimming flash without slowing movement of the logs along the path or requiring special alignment of the logs. Spin trim assemblies 176 on wheel 28 rotate around the wheel at the same speed of the logs permitting capture and spinning of the logs for spin trimming without altering downstream movement of the logs along the path.

Continuous downstream movement of the logs during trimming facilitates high-speed operation of machine 10. There is no need to stop movement of the logs or reorient the logs in a known position before trimming. Indexing of individual logs is eliminated.

Machine 10 has been described in connection with trimming of plastic from two bottle logs. If desired, the machine may be used to trim neck flash and neck rings from single body logs using single vacuum nests and tooling for single bottle logs rather than two bottle logs. The single bottle logs trimmed by the machine may have necks located to one side of the bottle, like bottle B, or centrally located necks.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention:

1. A method of cutting a plastic body ejected from a blow mold, the body having opposite end portions, the method comprising the steps of:
    (a) continuously moving a log conveyor along a path between an intake location and a discharge location, the log conveyor having first and second holders configured to receive respective end portions of the log;
    (b) receiving the body on the log conveyor between the first and second holders at the intake location along the path, the body received on an axis with respect to the first and second holders, the continuous movement of the log conveyor moving the holders and the body away from the intake location in a downstream direction along the path;
    (c) moving each holder with respect to the axis along the axis towards the body and receiving each end portion of the body in a respective first and second holder while maintaining the body in a stationary position with respect to the axis as the holders are moving along the axis;
    (d) rotating the holders about the axis and thereby rotating the body in the holders about the axis;
    (e) moving the log conveyor carrying the rotating body past a stationary trim knife extending a distance along the path, the trim knife engaging the rotating body between the holders and thereby cutting the body as the log conveyor moves along the path;
    (f) moving each holder along the axis away from the cut body to release the cut plastic body from the holders while maintaining the cut plastic body in a stationary position with respect to the axis as the holders are moving away from the body; and
    (g) discharging the cut plastic body from the log conveyor at the discharge location along the path.

2. The method of claim 1 comprising the step of:
    (h) supporting the body against a support surface while the body is on the axis.

3. The method of claim 1 wherein step (a) comprises the step of:
    (h) revolving the log conveyor about an axis of revolution, the trim knife extending at least partially around the axis of revolution.

4. The method of claim 1 wherein step (d) comprises the step of:
    (h) successively rotating the holders in a first direction and then in an opposite second direction while the body is engaged with the trim knife.

5. The method of claim 1 wherein the body has an offset neck that extends along an offset axis and step (d) comprises the step of:
    (h) rotating the holders about the offset axis of the body.

6. The method of claim 1 comprising the step of:
    (h) supporting a portion of the body between the holders while the body is engaged with the trim knife.

7. The method of claim 6 wherein step (h) comprises the step of:
    (i) confining the supported portion of the body between a support that moves with the holders past the trim knife and a holddown surface that is stationary with respect to the trim knife.

8. The method of claim 1 wherein the trim knife represents a first trim knife and step (e) comprises the step of:
    (h) moving the log conveyor past a second trim knife spaced from the first trim knife, the first and second trim knifes configured to simultaneously engage and cut the rotating body as the log conveyor moves along a portion of the path.

9. The method of claim 8 comprising the step of:
    (i) supporting first and second portions of the body while the body is engaged with the trim knife, each portion between a respective trim knife and holder.

10. The method of claim 9 wherein step (i) comprises the step of:
    (j) confining each supported portion of the body between a support that moves with the log conveyor past the trim knives and a respective holddown surface that is stationary with respect to the trim knives.

11. The method of claim 1 wherein step (e) comprises the step of:
    (h) revolving the log conveyor about a horizontal axis of revolution, the log conveyor spaced from the axis.

12. The method of claim 1 comprising the step of:
    (h) supplying a plurality of log conveyors;
    (i) simultaneously moving the plurality of log conveyors continuously along a the path;
    (j) flowing a stream of uncut plastic bodies to the plurality of log conveyors;
    (k) sequentially loading the uncut plastic bodies into respective log conveyors at the intake location along the path; and
    (l) sequentially unloading cut plastic bodies from the respective log conveyors at the discharge location along the path.

13. The method of claim 1 wherein step (b) comprises the step of:
    (h) placing the body on the axis with the body in a predetermined rotational orientation with respect to the axis.

14. The method of claim 1 wherein step (d) comprises the step of:
    (h) rotating the holders in a first direction of rotation and rotating the holders in an opposite second direction of rotation.

15. The method of claim 14 wherein step (h) comprises the step of:

(i) starting rotation in the first direction of rotation with the body at a first angular position with respect to the axis and stopping rotation in the second direction of rotation with the body returned to the first angular position.

16. The method of claim 1 wherein the log conveyor represents a first log conveyor, the method comprising the step of:

(h) discharging the cut plastic body from the first log conveyor to a second log conveyor continuously moving along a respective path different from the path of the first log conveyor.

17. The method of claim 1 wherein the log conveyor represents a first log conveyor, the method comprising the step of:

(h) receiving the body onto the first log conveyor from a second log conveyor continuously moving along a respective path different from the path of the first log conveyor.

18. The method of claim 1 wherein step (c) comprises the step of:

(h) applying suction urging the body against the log conveyor to hold the body against the log conveyor while the holders are moving towards the body.

19. The method of claim 1 wherein step (f) comprises the step of:

(h) applying suction urging the cut body against the log conveyor to hold the cut body against the log conveyor while the holders are moving away from the body.

20. The method of claim 1 wherein step (d) comprises the step of:

(i) actuating a first cam drive to rotate the holders, the first cam drive comprising a first cam member connected to the log conveyor and a stationary cam member extending along the path.

21. The method of claim 1 wherein step (d) comprises the step of:

(j) actuating a second cam drive to move the holders towards or away from the body, the second cam drive comprising a first cam member connected to the log conveyor for movement with the log conveyor and a stationary cam member extending along the path.

22. The method of claim 1 wherein the log conveyor moves in a downstream direction from the intake location to the downstream location, and the trim knife is spaced downstream from the intake location of the path.

23. The method of claim 1 wherein the log conveyor moves in a downstream direction from the intake location to the downstream location, and the trim knife is spaced upstream from the discharge location along the path.

24. The method of claim 1 wherein step (e) comprises the step of the trim knife gradually cutting the plastic body as the log conveyor moves the plastic body along the path.

25. The method of claim 1 wherein step (e) comprises the step of the trim knife initially punctures a thickness of the plastic body and then cutting the entire thickness of the neck as the log conveyor moves the plastic body along the path.

26. A method of cutting a plastic body ejected from a blow mold, the body having opposite end portions, the method comprising the steps of:

(a) placing the body on an axis between first and second holders;

(b) moving each holder along the axis towards the body and receiving each end portion of the body in a respective first and second holder;

(c) maintaining the body in a stationary position with respect to the axis while the holders are moving towards the body;

(d) rotating the holders about the axis and rotating the body in the holders about the axis;

(e) relatively moving the rotating body past a stationary trim knife, the trim knife engaging the rotating body between the holders and cutting the body;

(f) successively rotating the holders in a first direction and then in an opposite second direction while the body is engaged with the trim knife;

(g) moving each holder along the axis away from the cut body to release the cut plastic body from the holders; and (h) maintaining the cut plastic body in a stationary position with respect to the axis while the holders are moving away from the body.

27. A method of cutting a plastic body ejected from a blow mold, the body having opposite end portions, the method comprising the steps of:

(a) placing the body on an axis between first and second holders;

(b) moving each holder along the axis towards the body and receiving each end portion of the body in a respective first and second holder;

(c) maintaining the body in a stationary position with respect to the axis while the holders are moving towards the body;

(d) rotating the holders about the axis and rotating the body in the holders about the axis, the holders being rotated in a first direction of rotation and in an opposite second direction of rotation;

(e) relatively moving the rotating body past a stationary trim knife, the trim knife engaging the rotating body between the holders and cutting the body;

(f) moving each holder along the axis away from the cut body to release the cut plastic body from the holders; and (g) maintaining the cut plastic body in a stationary position with respect to the axis while the holders are moving away from the body.

28. The method of claim 27 wherein step (d) comprises the step of:

(h) starting rotation in the first direction of rotation with the body at a first angular position with respect to the axis and stopping rotation in the second direction of rotation with the body returned to the first angular position.

* * * * *